3,349,096
METHOD FOR PRODUCING 1-HYDROXYALKYL-
2-ARYL-5-NITROIMIDAZOLES, INTERMEDIATES
USED THEREIN, AND PRODUCTS PRODUCED
THEREBY
Clarence S. Rooney, Bridgewater Township, N.J., assignor to Merck & Co., Inc., Rahway, N.J., a corporation of New Jersey
No Drawing. Filed Mar. 17, 1966, Ser. No. 535,039
22 Claims. (Cl. 260—299)

This application is a continuation-in-part of my application Ser. No. 448,843, filed Apr. 16, 1965 and now abandoned.

This invention relates generally to novel chemical processes. More particularly, it relates to novel hydroxyalkylation processes. Still more specifically, it is concerned with a new and novel process for forming 1-hydroxyalkyl and 1-hydroxy substituted alkyl imidazole compounds. It is concerned also with novel compounds used in carrying out said hydroxyalkylation.

The 1-hydroxyalkylated 2-aryl-5-nitroimidazoles within the scope of the present invention have the structure:

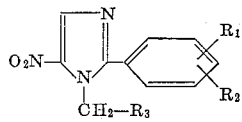

wherein $R_3$ is hydroxyalkyl, hydroxyloweralkoxyalkyl or substituted hydroxyloweralkyl; wherein the hydroxyloweralkyl is substituted by hydroxy, halo, carboxy, lower alkoxy, aldehydo, cyano, carboxamido, loweralkylcarboxy or phenoxy groups. $R_1$ and $R_2$ are selected from the group consisting of:

hydrogen, halo, nitro, thienyl, furyl, cyanato, cyano, thiocyano, carboxy, loweralkenoyl, mononucleararyl-loweralkenoyl, loweralkanoyl, mononucleararyl-loweralkanoyl, carbalkoxy, haloloweralkenyl, phenyldiazo, loweralkylsulfinyl, loweralkylsulfonyl, formylloweralkyl and substituted loweralkyl wherein the substituents are loweralkanoylamino, hydroxy, phenoxycarbonyloxy, loweralkoxy, diloweralkoxy, diloweralkylcarbamoyloxy, diloweralkylthioncarbamoyloxy, halo;
loweralkoxy and substituted loweralkoxy, wherein the substituents are halo, carbamoyl and thiocarbamoyl, substituted amino, wherein the substituents are halolower-alkanoyl, diloweralkylcarbamoylloweralkyl, loweralkanoyl, mononucleararylalkanoyl;
substituted thio wherein the substituents are loweralkyl, diloweralkylthioncarbamoyl, loweralkylthioncarbamoyl, thioncarbamoyl, loweralkoxythiocarbonyl;
sulfonamido and substituted sulfonamido, wherein the substituents are loweralkyl, mononucleararyl, mononucleararylloweralkyl;
carboxamido and substituted carboxamido, wherein the substituents are lower alkyl, mononucleararyl, and mononucleararylloweralkyl;
carbamoyloxy and substituted carbamoyloxy wherein the substituents are diloweralkyl;
diloweralkylthio, carbamoyloxy;
in all of the groups above and hereinbelow, the terms loweralkyl, loweralkenyl, loweralkoxy, loweralkanoyl, and loweralkenoyl represent groups having from 1 to 5 carbon atoms.

The 1-hydroxyalkylated 2-aryl-5-nitroimidazoles of the present invention exhibit physiological activity, notably certain of these compounds have useful antiprotozoal, antihelmintic and antibacterial activity and are especially useful against certain diseases in particular enterohepatitis, trichomoniasis, amoebiasis, and PPLO; the former being particularly important in turkeys. Certain of these compounds also exhibit activity against the ascaris worm, schistosomes, and heterakis.

The chemical synthesis of highly substituted imidazoles heretofore known have not been satisfactory since they afford only low yields of the desired compounds. One possible method is the direct hydroxyalkylation of a 2-phenyl (or substituted phenyl)-4(5)-nitroimidazole of the formula:

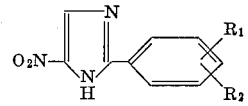

where $R_1$ and $R_2$ is as previously defined. It has been reported that certain 1-(2-hydroxyethyl)-2-hydrocarbon-5-nitroimidazoles can be obtained by direct reaction of a 2-hydrocarbon-4(5)-nitroimidazole with ethylene oxide in a lower aliphatic acid such as formic or acetic acid. This process is not, however, satisfactory when the 2-substituent is aryl or substituted aryl because only very low yields of product are realized. Research with the objective of finding a new synthesis has therefore continued.

An object of this invention is provision of a method for preparing 1-(hydroxyloweralkyl) or -(hydroxy substituted loweralkyl)-2-aryl (or substituted aryl)-5-nitroimidazole compounds from 2-aryl (or substituted aryl)-4(5)-nitroimidazoles. It is an additional object of the present invention to provide a new and improved method for making 1-(2-hydroxyethyl)-2-phenyl (and substituted phenyl)-5-nitroimidazoles from 2-phenyl (and substituted phenyl)-4(5)-nitroimidazoles.

A further object is to provide a method for the direct 1-(hydroxyalkylation) of 2-phenyl (and substituted phenyl)-4(5)-nitroimidazoles in high yield. Still another object is provision of a direct hydroxyalkylation process in which hydroxyalkylation occurs substantially exclusively at the 1-position of the imidazole ring, i.e. on the nitrogen atom adjacent to both the nitro group and the phenyl or substituted phenyl radical.

A still further object is provision of such synthesis in which a Lewis acid complex of 2-aryl-4(5)-nitroimidazole, and especially 2-phenyl (and substituted phenyl)-4(5)-nitroimidazole, is reacted with a 1,2-epoxy or 1,3-epoxy-loweralkane or substituted loweralkane. Other and more detailed objects will become evident from the following description of the invention.

In accordance with this invention, it has now been found that a 1-(hydroxyalkylated)-2-phenyl (or substituted phenyl)-5-nitroimidazole is obtained in high yield and to the substantial exclusion of the 4-nitro isomer by the direct reaction of a 1,2-epoxy or 1,3-epoxyloweralkane or substituted loweralkane with the equimolar complex of 2-aryl-4(5)-nitroimidazole, particularly 2-(phenyl or substituted phenyl)-nitroimidazole, and a Lewis acid. This process is shown structurally below for the process employing a 1,2-epoxyloweralkane:

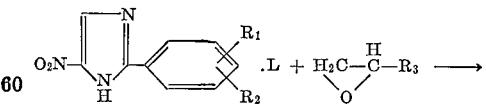

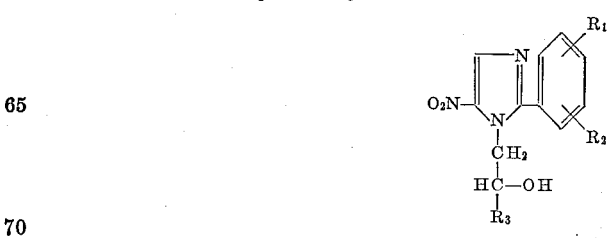

where L is a Lewis acid and $R_1$, $R_2$ and $R_3$ are as above.

In place of a 1,2-epoxide such as 1,2-ethylene oxide other 1,2-epoxides such as epichlorohydrin, epibromohydrin, 2,3- epoxypropanol, 2,3-epoxypropionaldehyde, ethyl-2,3-epoxypropionate, 1,2-epoxy-3-isopropoxy propane, 1,2-epoxy-3-phenoxy propane, 2,3-epoxypropionitrile, 2,3-epoxypropionamide 2-methyl-2,3-epoxypropionic acid and the esters thereof and 2,3-epoxypropionic acid and the esters thereof. Also suitable are 1,3-epoxides such as 1,3-epoxypropane, 1,3-epoxybutane, and 1,3-epoxypentane.

When the process of the invention is conducted using any of the aforementioned epoxides or analogs thereof in place of 1,2-epoxyethane, the corresponding 1-(hydroxyalkylated)-2-(phenyl or substituted phenyl)-5-nitroimidazole is produced, the substituents at the 2-position of the imidazole ring remaining as previously described. The details of the invention will be discussed hereinafter with respect to the use of 1,2-epoxides and consequent formation of a 1-(2-hydroxyalkyl)-imidazole, although it is to be understood that the starting Lewis acid nitroimidazole complexes and the reaction conditions are the same when a 1,3-epoxide reactant or any of the other epoxides mentioned herein is employed.

The complex of Lewis acid and 2-(phenyl or substituted phenyl)-4(5)-nitroimidazole employed in this process is a molecular compound obtained by contacting Lewis acid and the nitroimidazole, and consists of equimolar amounts of the Lewis acid and nitroimidazole. The molecular compounds, which are also referred to herein as equimolar complexes, may be isolated and crystallized if so desired. They have their own characteristic physical properties such as melting point and infrared spectrum.

Where the oxide reactant is a lower 1,2-epoxyalkane, such as 1,2-epoxyethane, propane and butane, there is produced the corresponding 1-(2'-hydroxyloweralkyl) imidazole, for example, a 1-(2'-hydroxyethyl)-imidazole, a 1-(2'-hydroxypropyl)-imidazole, and a 1-(2'-hydroxybutyl)-imidazole. Where the oxide reactant is epichlorohydrin or epibromohydrin, there is produced the corresponding 1-(2'-hydroxy-3'-chloropropyl)-imidazole and the 1-(2'-hydroxy-3'-bromopropyl)-imidazole. Similarly, where the oxide reactant is 2,3-epoxypropanol, 2,3- epoxypropionaldehyde, ethyl-2,3-epoxypropionate, 2,3-epoxypropionitrile, 2,3-epoxypropionamide, 2,3-epoxypropionic acid and 2-methyl-2-epoxypropionic acid, there will be obtained the corresponding 3-[imidazole-1-yl]-propone-1,2-diol, 3 - [imidazole-1-yl]-2-hydroxypropionaldehyde, ethyl-3-[imidazole-1-yl]-2-hydroxypropionate, 3-[imidazole-1-yl]-2-hydroxypropionitrile, 3-[imidazole-1-yl]-2-hydroxypropionamide, 3-[imidazole-1-yl] - 2 - hydroxypropionic acid, and 3-[imidazole-1-yl]-2-hydroxy-2-methylpropionic acid. Similarly, where ethers such as 1,2-epoxy-3-isopropoxypropane and 1,2-epoxy-3-phenoxypropane are employed as the oxide reagent, there is obtained the corresponding 1-(2-hydroxy-3-isopropoxypropyl)-imidazole and 1-(2-hydroxy-3-phenoxypropyl)-imidazole.

Formation of the Lewis acid nitroimidazole equimolar complex is effected by contacting the two reactants in essentially equimolar amounts in a suitable solvent medium. Since isolation of the complex is unnecessary when it is to be used directly in the reaction with lower alkylene oxide, it is very convenient to prepare the complex in a solvent medium which can then be used for the alkylene oxide reaction. Examples of suitable reaction media are lower aliphatic acids such as formic, acetic, propionic or butyric acids, and lower aliphatic alcohols, such as methanol, ethanol and isopropanol, aprotic solvents, such as nitromethane, ethylene dichloride, tetramethylene sulfone and benzene, ethers such as tetrahydrofuran, dioxan and ethyleneglycol dimethyl ether, esters such as ethyl acetate may also be used. The complexes form readily and essentially quantitatively at temperatures of between about —40° C. to about 60° C., with best results being obtained at reaction temperatures of between about 20° C. and 50° C.

Lewis acids generally will form complexes with 5-nitroimidazoles, however the solubility of the Lewis acid nitroimidazoles in an inert solvent which will also dissolve the 5-nitroimidazole is sometimes limited, thus limiting the amount of complex formed. Certain Lewis acids are therefore especially suitable for the formation of an equimolar complex and the further reaction of the complex with an epoxide; these Lewis acids include boron trifluoride, sulfur trioxide, stannic chloride, titanium tetrachloride, aluminum trichloride and antimony pentachloride. However, it should be noted that the last two named compounds may only be used in an aprotic medium. The source of Lewis acid is not critical. For example, where the preferred Lewis acid, boron trifluoride, is employed it is convenient to employ the boron trifluoride-diethyl ether complex known to the art as boron trifluoride ethrate, or the boron trifluoride acetic acid complex, although boron trifluoride gas may itself be used if desired.

Examples of equimolar complexes obtained in accordance with this invention are the complexes of boron trifluoride or sulfur trioxide, stannic chloride, titanium tetrachloride, aluminum trichloride, and antimony pentachloride with a compound of the formula:

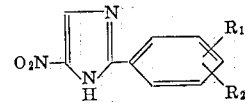

wherein $R_1$ and $R_2$ have the value as above.

These compounds are described as 4(5)-nitroimidazoles in accordance with recognized chemical nomenclature practice since the 4 and 5 positions of the imidazole ring are equivalent in these particular compounds. This equivalency is, of course, lost upon introduction of the substituent.

The substituent $R_1$ or $R_2$ in the 2-phenyl radical should be one that will not interfere with formation of the Lewis acid complex, i.e. it should not, for instance, be an amino or other group that is itself sufficiently basic to complex with the Lewis acid.

The direct hydroxyalkylation process of the invention is carried out by reacting together a 1,2-epoxy or 1,3-epoxy alkane or substituted epoxy alkane and the nitroimidazole:Lewis acid complex in a suitable reaction medium. Highly satisfactory results are obtained by carrying out the reaction in a lower aliphatic acid such as formic, acetic, propionic or butyric acid, and use of such acids, particularly acetic acid, is preferred. With these acidic solvents, good results are obtained at reaction temperatures of about 15–70° C. Alternatively, the process may be conducted in non-basic aprotic solvents such as nitromethane, benzene, ethylene dichloride, tetramethylene sulfone, tetrahydrofuran, dioxan, ethyleneglycol dimethylether and ethyl acetate although the reaction is somewhat slower than in the aliphatic acids and reaction time of up to 30 hours are preferred for best results.

A molar excess epoxide is used in the reaction. From about 1–20 moles of oxide per mole of nitroimidazole: Lewis acid complex are normally employed, with about 5–15 moles of oxide per mole of complex being preferred, where the solvent employed is a lower alkanoic acid. However, where an aprotic solvent is employed, a smaller excess, suitably from 1½ to 5 moles of oxide is preferred.

It is preferred to add the oxide gradually, at such a rate as to keep the reaction within the desired temperature range. Where the reaction solvent is a lower alkanoic acid, the reaction is an exothermic and rapid one, and is substantially complete on conclusion of lower alkylene oxide addition. However, where the reaction is carried in an aprotic medium, there is no appreciable rise in temperature and the reaction mixture is allowed to stand at ambient temperature say between 15 and 25° C. for from about 18 to about 30 hours.

Preparation of 1-(2-hydroxyethyl)-2-(phenyl or substituted phenyl)-5-nitroimidazoles by reaction of the Lewis acid complex with ethylene oxide under the above-described conditions constitutes a preferred embodiment of the invention.

At the end of the reaction, the 1-(2-hydroxy-loweralkyl or substituted loweralkyl)-2-(phenyl or substituted phenyl)-5-nitroimidazole is separated from unreacted starting material and recovered by techniques known to those skilled in this art. The difference in acidity between the starting material and the final 1-hydroxyalkylated imidazole may be used to good advantage in achieving separation of the two imidazole compounds.

By the process of this invention, namely direct hydroxyalkylation of a 2-(phenyl or substituted phenyl)-4(5)-nitroimidazole:Lewis acid complex, it is possible to obtain 1-(hydroxyalkylated)2-(phenyl or substituted phenyl)-5-nitroimidazole compounds in yields significantly higher than those obtainable by previously known methods. Yields of at least about 40% and in many cases as high as 60–65%, of the consumed starting material are realized in the synthesis of 1-(2-hydroxyethyl)-2-(phenyl or substituted phenyl)-5-nitroimidazoles under the preferred conditions of the invention. It will be appreciated that the yields will depend to some degree on the nature of the starting imidazole-Lewis acid complex and the particular lower alkylene epoxides employed, although in all cases the yields are higher than those obtained by the previously known methods.

This novel process is broadly applicable to the synthesis of 1-(hydroxyalkylated)-2-$R_5$-5-nitroimidazoles, where $R_5$ is phenyl or substituted phenyl. The particular substituent on the phenyl radical is not a critical aspect of the invention. It will of necessity be one that does not interfere with formation of the requisite equimolar complex of Lewis acid and nitroimidazole used as starting material. Further, it is desirable that it be essentially unreactive with the lower alkylene-epoxide. Representative examples of compounds obtained by the process of this invention from a Lewis acid complex of the corresponding nitroimidazole are:

1-(2'-hydroxyethyl)-2-(phenyl)-5-nitroimidazole,
1-(2'-hydroxyethyl)-2-(m-tolyl)-5-nitroimidazole,
1-(2'-hydroxyethyl)-2-(o-tolyl)-5-nitroimidazole,
1-(2'-hydroxyethyl)-2-(p-tolyl)-5-nitroimidazole,
1-(2'-hydroxyethyl)-2-(o-ethylphenyl)-5-nitroimidazole,
1-(2'-hydroxyethyl)-2-(p-ethylphenyl)-5-nitroimidazole,
1-(2'-hydroxyethyl)-2-(o-butylphenyl)-5-nitroimidazole,
1-(2'-hydroxyethyl)-2-(p-diphenyl)-5-nitroimidazole,
1-(2'-hydroxyethyl)-2-(m-diphenyl)-5-nitroimidazole,
1-(2'-hydroxyethyl)-2-(p-methoxyphenyl)-5-nitroimidazole,
1-(2'-hydroxyethyl)-2-(m-methoxyphenyl)-5-nitroimidazole,
1-(2'-hydroxyethyl)-2-(o-methoxyphenyl)-5-nitroimidazole,
1-(2'-hydroxyethyl)-2-(p-ethoxyphenyl)-5-nitroimidazole,
1-(2'-hydroxyethyl)-2-(p-isopropoxyphenyl)-5-nitroimidazole,
1-(2'-hydroxyethyl)-2-(o-n-butoxyphenyl)-5-nitroimidazole,
1-(2'-hydroxyethyl)-2-(p-n-butoxyphenyl)-5-nitroimidazole,
1-(2'-hydroxyethyl)-2-(p-isobutoxyphenyl)-5-nitroimidazole,
1-(2'-hydroxyethyl)-2-(p-methylthiophenyl)-5-nitroimidazole,
1-(2'-hydroxyethyl)-2-(m-methylthiophenyl)-5-nitroimidazole,
1-(2'-hydroxyethyl)-2-(p-ethylthiophenyl)-5-nitroimidazole,
1-(2'-hydroxyethyl)-2-(m-n-propylthiophenyl)-5-nitroimidazole,
1-(2'-hydroxyethyl)-2-(p-isopropylthiophenyl)-5-nitroimidazole,
1-(2'-hydroxyethyl)-2-(p-carboxamidophenyl)-5-nitroimidazole,
1-(2'-hydroxyethyl)-2-(p-NN-dimethylcarboxamidophenyl)-5-nitroimidazole,
1-(2'-hydroxyethyl)-2-(o-NN-diethylcarboxamidophenyl)-5-nitroimidazole,
1-(2'-hydroxyethyl)-2-(p-NN-diisopropylcarboxamidophenyl)-5-nitroimidazole,
1-(2'-hydroxyethyl)-2-(p-NN-disecbutylcarboxamidophenyl)-5-nitroimidazole,
1-(2'-hydroxyethyl)-2-(p-NN-di-n-pentylcarboxamidophenyl)-5-nitroimidazole,
1-(2'-hydroxyethyl)-2-(p-N-pyrollidinocarbonylphenyl)-5-nitroimidazole,
1-(2'-hydroxyethyl)-2-(p-N-morpholinocarbonylphenyl)-5-nitroimidazole,
1-(2-hydroxyethyl-2-(p-sulphonamidophenyl)-5-nitroimidazole,
1-(2-hydroxyethyl)-2-(p-NN-dimethylsulfonamidophenyl)-5-nitroimidazole,
1-(2-hydroxyethyl)-2-(O-NN-diethylsulfonamidophenyl)-5-nitroimidazole,
1-(2-hydroxyethyl)-2-(p-NN-diisopropylsulfonamidophenyl)-5-nitroimidazole,
1-(2-hydroxyethyl)-2-(p-NN-disecbutylsulfonamidophenyl)-5-nitroimidazole,
1-(2-hydroxyethyl)-2-(p-NN-di-n-pentylsulfonamidophenyl)-5-nitroimidazole,
1-(2-hydroxyethyl)-2-(p-N-pyrrolidinylsulfonylphenyl)-5-nitroimidazole,
1-(2-hydroxyethyl)-2-(p-N-morpholinylsulfonylphenyl)-5-nitroimidazole,
1-(2-hydroxyethyl)-2-(m-methylsulfonylphenyl)-5-nitroimidazole,
1-(2-hydroxyethyl)-2-(p-ethylsulfonylphenyl)-5-nitroimidazole,
1-(2-hydroxyethyl)-2-(p-isopropylsulfonylphenyl)-5-nitroimidazole,
1-(2-hydroxyethyl)-2-(o-n-butylsulfonylphenyl)-5-nitroimidazole,
1-(2-hydroxyethyl)-2-(p-sec-butylsulfonylphenyl)-5-nitroimidazole,
1-(2-hydroxyethyl)-2-(o-n-pentylsulfonylphenyl)-5-nitroimidazole,
1-(2-hydroxyethyl)-2-(o-cyanophenyl)-5-nitroimidazole,
1-(2-hydroxyethyl)-2-(m-cyanophenyl)-5-nitroimidazole,
1-(2-hydroxyethyl)-2-(p-cyanophenyl)-5-nitroimidazole,
1-(2-hydroxyethyl)-2-(p-formylaminophenyl)-5-nitroimidazole,
1-(2-hydroxyethyl)-2-(o-acetylaminophenyl)-5-nitroimidazole,
1-(2-hydroxyethyl)-2-(p-propionylaminophenyl)-5-nitroimidazole,
1-(2-hydroxyethyl)-2-(p-isobutyrylaminophenyl)-5-nitroimidazole,
1-(2-hydroxyethyl)-2-(m-valerylaminophenyl)-5-nitroimidazole,
1-(2-hydroxyethyl)-2-(p-n-butylthiophenyl)-5-nitroimidazole,
1-(2-hydroxyethyl)-2-(o-secbutylthiophenyl)-5-nitroimidazole,
1-(2-hydroxyethyl)-2-(p-fluorophenyl)-5-nitroimidazole,
1-(2-hydroxyethyl)-2-(p-chlorophenyl)-5-nitroimidazole,
1-(2-hydroxyethyl)-2-(m-fluorophenyl)-5-nitroimidazole,
1-(2-hydroxyethyl)-2-(3',4'-dichlorophenyl)-5-nitroimidazole,
1-(2-hydroxyethyl)-2-(o-nitrophenyl)-5-nitroimidazole,
1-(2-hydroxyethyl)-2-(m-nitrophenyl)-5-nitroimidazole,
1-(2-hydroxyethyl)-2-(p-nitrophenyl)-5-nitroimidazole,
1-(2-hydroxyethyl)-2-(3,5-dinitrophenyl)-5-nitroimidazole, 1-(2-hydroxyethyl)-2-(2,4-dinitrophenyl)-5-
  nitroimidazole,
1-(2-hydroxyethyl)-2-(o-formylphenyl)-5-
  nitroimidazole,
1-(2-hydroxyethyl)-2-(o-acetylphenyl)-5-nitroimidazole,
1-(2-hydroxyethyl)-2-(p-acetylphenyl)-5-nitroimidazole,
1-(2-hydroxyethyl)-2-(p-propionylphenyl)-5-
  nitroimidazole,
1-(2-hydroxyethyl)-2-(o-valerylphenyl)-5-
  nitroimidazole,
1-(2-hydroxyethyl)-2-(p-benzoylphenyl)-5-
  nitroimidazole,
1-(2-hydroxyethyl)-2-(p-carbomethoxyphenyl)-5-
  nitroimidazole,
1-(2-hydroxyethyl)-2-(m-carboethoxyphenyl)-5-
  nitroimidazole,
1-(2-hydroxyethyl)-2-(p-carbo-n-propoxyphenyl)-5-
  nitroimidazole,
1(2-hydroxyethyl)-2-(o-carboisopropoxyphenyl)-5-
  nitroimidazole,
1-(2-hydroxyethyl)-2-(p-carbo-n-butoxyphenyl)-5-
  nitroimidazole;

also included within the scope of the present invention are:

1-(2-hydroxyethyl)-2-(benzenesulfonamidophenyl)-5-
  nitroimidazole,
1-(2-hydroxyethyl)-2-(haloacylaminophenyl)-5-
  nitroimidazoles,
1-(2-hydroxyethyl)-2-(acylaminoloweralkylphenyl)-5-
  nitroimidazoles,
1-(2-hydroxyethyl)-2-(diloweralkoxymethylphenyl)-5-
  nitroimidazoles,
1-(2-hydroxyethyl)-2-(loweralkoxymethylphenyl)-5-
  nitroimidazoles,
1-(2-hydroxyethyl)-2-(formylphenyl)-5-nitroimidazole,
1-(2-hydroxyethyl)-2-(hydroxymethylphenyl)-5-
  nitroimidazole,
1-(2-hydroxyethyl)-2-
  (phenoxycarbonyloxymethylphenyl)-5-nitroimidazole,
1-(2-hydroxyethyl)-2-
  (dialkylcarbamoyloxymethylphenyl)-5-nitroimidazoles,
1-(2-hydroxyethyl)-2-
  (dialkylthiocarbamoyloxymethylphenyl)-5-
  nitroimidazoles,
1-(2-hydroxyethyl)-2-(dialkylthioncarbamoylphenyl)-5-
  nitroimidazoles,
1-(2-hydroxyethyl)-2-(haloloweralkylphenyl)-5-
  nitroimidazoles,
1-(2-hydroxyethyl)-2-(loweralkylsulfoxyphenyl)-5-
  nitroimidazole,
1-(2-hydroxyethyl)-2-(thiocyanophenyl)-5-
  nitroimidazole,
1-(2-hydroxyethyl)-2-
  (thiondiloweralkylcarbamoylthiophenyl)-5-
  nitroimidazoles,
1-(2-hydroxyethyl)-2-
  (thionloweralkylcarbamoylthiophenyl)-5-
  nitroimidazoles,
1-(2-hydroxyethyl)-2-(thioncarbamoylthiophenyl)-5-
  nitroimidazole,
1-(2-hydroxyethyl)-2-
  (loweralkoxythiocarbonylthiophenyl)-5-
  nitroimidazoles,
1-(2-hydroxyethyl)-2-(haloloweralkoxyphenyl)-5-
  nitroimidazoles,
1-(2-hydroxyethyl)-2-(carbamoylloweralkoxyphenyl)-5-
  nitroimidazoles,
1-(2-hydroxyethyl)-2-
  (thiocarbamoylloweralkoxyphenyl)-5-nitroimidazoles,
1-(2-hydroxyethyl)-2-(dialkylcarbamoyloxyphenyl)-5-
  nitroimidazoles,
1-(2-hydroxyethyl)-2-(dialkylthioncarbamoyloxyphenyl)-
  5-nitroimidazoles,
1-(2-hydroxyethyl)-2-(phenyldiazophenyl)-5-
  nitroimidazole,
1-(2-hydroxyethyl)-2-(haloalkenylphenyl)-5-
  nitroimidazoles,
1-(2-hydroxyethyl)-2-(thienylphenyl)-5-nitroimidazole,
1-(2-hydroxyethyl)-2-(furylphenyl)-5-nitroimidazole,
1-(2-hydroxyethyl)-2-(cyanatophenyl)-5-nitroimidazole.

All of the foregoing compounds are obtained by reaction of the equimolar complex with ethylene oxide.

Similarly, when other alkylene epoxides are used in place of 1,2-ethyleneepoxide, the corresponding 1-(hydroxy substituted alkyl)-4(5)-nitroimidazoles are obtained. Included within the scope of this class are:

epichlorohydrin,
epibromohydrin,
1,2-epoxypropane,
1,2-epoxybutane,
1,2-epoxypentane,
2,3-epoxypropanol,
2,3-epoxypropionaldehyde,
ethyl-2,3-epoxypropionate,
2,3-epoxypropionitrile,
2,3-epoxypropionamide,
2,3-epoxypropionic acid,
2-methyl-2-epoxypropionic acid,
1,2-epoxy-3-isopropoxypropane, and
1,2-epoxy-3-phenoxypropane.

The following examples are given for the purpose of illustration and not by way of limitation.

Example 1

2.07 g. (0.01 m.) of 2-(p-fluorophenyl)-4(5)-nitroimidazole and 1.5 g. (0.01 m.) of boron trifluoride etherate are added to 20 ml. of glacial acetic acid. The solution is warmed to about 30° C. and stirred vigorously while ethylene oxide gas is added to it from a gas burett. A total of 3660 ml. (0.163 m.) of ethylene oxide gas is added over a period of two hours while maintaining the reaction temperature at about 30–40° C. On completion of the ethylene oxide addition, acetic acid is removed by distillation in vacuo and the residue dissolved in about 150 ml. of chloroform. The chloroform solution is washed with four 20 ml. portions of 4 N ammonium hydroxide and once with water. The ammonia washes are combined, back-washed once with chloroform, and then adjusted to pH 3 with concentrated hydrochloric acid (15–17 ml.). 2-(p-fluorophenyl-4(5)-nitroimidazole precipitates and is recovered by filtration. 477 mg. of the starting material is obtained.

The chloroform solutions are combined, dried over sodium sulfate, and concentrated to dryness in vacuo. The residue thus obtained is dissolved in 50 ml. of chloroform and extracted with four 25 ml. portions of 2.2 N hydrochloric acid. The acidic extracts are combined, heated on a steam bath for 90 minutes, and then cooled and adjusted to about pH 3 with about 20 ml. of 11.7 N sodium hydroxide. 1 - (2-hydroxyethyl)-2-(p-fluorophenyl)-5-nitroimidazole precipitates. The mixture is cooled and the solid removed by filtration and dried. 1.06 g. of product are obtained, M.P. 163–165° C.

An additional 190 mg. of product are obtained by making the acidic mother liquor alkaline and extracting it twice with equal volumes of ethyl acetate. The ethyl acetate extracts are dried and concentrated to dryness to give a residue of crystalline product.

The heating of the acidic extracts of the chloroform solution may be eliminated without affecting the result.

Example 2

A mixture of 10.35 g. (0.05 m.) of 2-(p-fluorophenyl)-4(5)-nitroimidazole, 6.5 ml. (0.05 m.) of boron trifluoride etherate in 100 ml. of glacial acetic acid is stirred in a water bath at 25–30° C. To this solution there is added with stirring a solution of 25 ml. (0.5 m.) of liquid ethylene oxide in 25 ml. of hexane over a period of 75 minutes. During the ethylene oxide addition, the temperature of the reaction mixture is maintained at 30–35° C. When the ethylene oxide addition is complete, the reaction mixture is concentrated in vacuo to remove acetic acid and other low-boiling material. The residue is dissolved in 400 ml. of chloroform and the resulting solution extracted with four 100 ml. portions of 4 N N-ammonium hydroxide. The ammonia extracts are combined and acidified to about pH 4 with 75 ml. of concentrated hydrochloric acid. 2-(p-fluorophenyl)-4(5)-nitroimidazole precipitates and is recovered by filtration. 2.78 g. are obtained.

The chloroform solution from above is washed with water and then extracted with four 125 ml. volumes of 2.2 N hydrochloric acid. The acidic extracts are combined, heated on a steam bath for 90 minutes, cooled to room temperature, and finally adjusted to about pH 4 with 95 ml. of 11.7 N sodium hydroxide. 1-(2-hydroxyethyl)-2-(p-fluorophenyl)-5-nitroimidazole is precipitated. The mixture is cooled and the solid material recovered by filtration and dried to give 5.88 g. of 1-(2-hydroxyethyl)-2-(p-fluorophenyl)-5-nitroimidazole, M.P. 160–163° C.

*Example 3*

12.5 ml. (0.25 m.) of liquid ethylene oxide are added over a period of 40 minutes to a stirred mixture of 5.17 g. (0.025 m.) of 2-(p-fluorophenyl)-4(5)-nitroimidazole and 3.25 ml. (0.025 m.) of boron trifluoride etherate and 50 ml. of glacial acetic acid. During the ethylene oxide addition, the temperature of the reaction mixture is maintained at 32–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(p-fluorophenyl)-4(5)-nitroimidazole precipitates. It is recovered by filtration and dried. 1.40 g. are obtained.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-(2-hydroxyethyl) - 2-(p-fluorophenyl)-5-nitroimidazole precipitates. The mixture is cooled and the solid removed by filtration and dried to give 2.7 g. of product, M.P. 160–165° C. Recrystallization with benzene raises the melting point to about 165–168° C.

*Example 4*

(A) 0.32 ml. (0.0025 m.) of boron trifluoride etherate is added to a mixture of 0.472 g. (0.0025 m.) of 2-phenyl-4(5)-nitroimidazole and 10 ml. of acetic acid. Ethylene oxide gas is added directly to the resulting solution until the temperature of the mixture reaches 55–60° C. The addition is then stopped and the mixture cooled to about 40° C. Three further additions of ethylene oxide gas are made under similar conditions. The four separate gas additions require about one hour. The reaction mixture is then concentrated to dryness under reduced pressure and the residue dissolved in a mixture of 15 ml. of water, 75 ml. of ethyl acetate, and 10 ml. of 2.5 N sodium hydroxide. The aqueous solution is separated and acidified with dilute hydrochloric acid. 0.13 g. of 2-phenyl-4(5)-nitroimidazole is recovered.

The ethyl acetate solution is evaporated to an oil which is washed with hexane and extracted with ethyl ether. The ethyl ether extract is evaporated to dryness and the residue dissolved in a minimum volume of benzene. Hexane is added slowly to the benzene solution until crystallization begins. The crystalline 1-(2-hydroxyethyl)-2-phenyl-5-nitroimidazole thus obtained is removed by filtration and dried to give 0.056 g. On recrystallization from benzene-hexane the product melts at 123–127° C.

B. The experiment described in part A above is repeated using 0.37 ml. (0.0028 m.) of boron trifluoride etherate. A total of 640 ml. (0.026 m.) of ethylene oxide is added over a 40-minute period. At the end of this time the acetic acid is removed under vacuum and a mixture of 60 ml. of ethyl acetate and 10 ml. of 2.5 N sodium hydroxide added to the residue. The aqueous alkaline layer is separated and acidified with hydrochloric acid to precipitate 2-phenyl-4(5)-nitroimidazole. 0.304 g. are obtained.

The ethyl acetate extract is evaporated to dryness and extracted with benzene. Hexane is added slowly to the benzene filtrate to precipitate 1 - (2 - hydroxyethyl)-2-phenyl-5-nitroimidazole. The product is removed by filtration and recrystallized first from hexane and then from benzene to give substantially pure material, M.P. 122–124.5° C.

*Example 5*

To a stirred solution of 0.518 g. (0.0025 m.) of 2-(p-fluorophenyl)-4(5)-nitroimidazole and 0.32 ml. (0.0025 m.) of boron trifluoride etherate and 10 ml. of acetic acid is added 960 ml. (0.039 m.) of ethylene oxide gas over a period of 1¾ hours. At the end of this time, the acetic acid is removed by evaporation under reduced pressure and water, chloroform and dilute sodium hydroxide added to the residue thus obtained. The aqueous alkaline extract is separated and acidified with dilute hydrochloric acid. 2-(p-fluorophenyl)-4(5)-nitroimidazole precipitates and is collected by filtration. 0.127 g. are obtained.

The chloroform extract is concentrated to dryness to give 0.361 g. of 1-(2-hydroxyethyl)-2-(p-fluorophenyl)-5-nitroimidazole, M.P. 148–161° C. On recrystallization from benzene there is obtained 0.2 g. of substantially pure material, M.P. 164–167° C.

*Example 6*

0.16 ml. of boron trifluoride etherate is added to a slurry consisting of 0.23 g. of 2-phenyl-4(5)-nitroimidazole in 10 ml. of 1,2-dichloroethane. The resulting mixture is allowed to stand at room temperature for two days. At the end of this time the solid product is removed by filtration and dried. The solid thus obtained is the equimolar complex of boron trifluoride and 2-phenyl-4-(5)-nitroimidazole, M.P. 148–161° C.

*Example 7*

0.08 ml. of boron trifluoride etherate is added to a mixture of 0.129 g. of 2-(p-fluorophenyl)-4(5)-nitroimidazole and 5 ml. of nitromethane. The solution becomes clear after about 10 minutes. It is then evaporated to dryness in vacuo and 5 ml. of 1,2-dichloro ethane added to the residue. After a short time the equimolar complex of boron trifluoride and 2 - (p - fluorophenyl)-4(5)-nitroimidazole crystallizes slowly. It is recovered by filtration and dried. The complex decomposes over a range of 154–200°.

In accordance with the above procedure but starting with sulfur trioxide, stannic chloride, titanium tetrachloride, aluminum trichloride and antimony pentachloride in place of boron trifluoride etherate, there is obtained the equimolar complex of sulfur trioxide, and 2-(p-fluorophenyl)-4(5)-nitroimidazole-stannic chloride, 2-(p-fluorophenyl)-4(5)-nitroimidazole-titanium tetrachloride, 2-(p-fluorophenyl)-4(5)-nitroimidazole-aluminum trichloride and 2 - (p - fluorophenyl)-4(5)-nitroimidazole-antimony pentachloride respectively.

In the same way as in the above procedure and using any of the Lewis acids listed above and utilizing in place of
2-(p-fluorophenyl)4(5)-nitroimidazole,
2-(benzenesulfonamidophenyl)-4(5)-nitroimidazole,
2-(formylphenyl)-4(5)-nitroimidazole,
2-hydroxymethylphenyl)-4(5)-nitroimidazole,
2 - (phenoxycarbonyloxymethylphenyl)-4(5)-nitroimidazole, 2-(p-carboxamidophenyl)-4(5)-nitroimidazole,
2-(thiocyanophenyl)-4(5)-nitroimidazole,
2-(phenyldiazophenyl)-4(5)-nitroimidazole,
2-(thienylphenyl)-4(5)-nitroimidazole,
2-(furylphenyl)-4(5)-nitroimidazole, and
2-(cyanatophenyl)-4(5)-nitroimidazole, or a
2-(haloacylaminophenyl)-4(5)-nitroimidazole,
2-(acylaminoloweralkylphenyl)-4(5)-nitroimidazole,
2-(carboxyphenyl)-4(5)-nitroimidazole,
2-(diloweralkoxymethylphenyl)-4(5)-nitroimidazole,
2-(loweralkoxymethylphenyl)-4(5)-nitroimidazole,
2 - (dialkylcarbamoyloxymethylphenyl)-4(5)-nitroimidazole,
2 - (dialkylthiocarbamoyloxymethylphenyl) - 4(5)-nitroimidazole,
2-(dialkylthiocarbamoylphenyl)-4(5)-nitroimidazole,
2-(haloloweralkylphenyl)-4(5)-nitroimidazole,
2-(loweralkylsulfoxylphenyl)-4(5)-nitroimidazole,
2 - (thiondiloweralkylcarbamoylthiophenyl)-4(5)-nitroimidazole,
2 - (thionloweralkylcarbamoylthiophenyl) - 4(5) - nitroimidazole,
2-(thioncarbamoylthiophenyl)-4(5)-nitroimidazole,
2 - (loweralkoxythiocarbamoylthiophenyl) - 4(5)-nitroimidazole, 2 - (haloloweralkoxyphenyl) - 4(5)-nitroimidazole,
2-(carbamoylloweralkoxyphenyl)-4(5)-nitroimidazole,
2 - (thiocarbamoylloweralkoxyphenyl) - 4(5)-nitroimidazole,
2-(dialkylcarbamoyloxyphenyl)-4(5)-nitroimidazole,
2 - (dialkylthioncarbamoyloxyphenyl) - 4(5) - nitroimidazole,
2 - (haloalkenylphenyl)-4(5)-nitroimidazole, 2-(p-fluorophenyl)-4(5)-nitroimidazole,
2 - (m - nitrophenyl) - 4(5)-nitroimidazole, 2-(p-nitrophenyl)-4(5)-nitroimidazole,
2-(3,5-dinitrophenyl)-4(5)-nitroimidazole,
2-(2,4-dinitrophenyl)-4(5)-nitroimidazole,
2-(o-formylphenyl)-4(5)-nitroimidazole,
2-(o-nitrophenyl)-4(5)-nitroimidazole,
2-(m-cyanophenyl)-4(5)-nitroimidazole,
2-(p-cyanophenyl)-4(5)-nitroimidazole,
2-(p-formylaminophenyl)-4(5)-nitroimidazole,
2-(o-acetylaminophenyl-4(5)-nitroimidazole,
2-(o-cyanophenyl)-4(5)-nitroimidazole,
2-(o-sulfonamidophenyl)-4(5)-nitroimidazole,
2 - (o - NN-diethylsulfonamidophenyl)-4(5)-nitroimidazole,
2 - (p - NN - diisopropylsulfonamidophenyl)-4(5)-nitroimidazole,
2 - (p - NN - disecbutylsulfonamidophenyl)-4(5)-nitroimidazole,
2 - (p - NN - di-n-pentylsulfonamidophenyl)-4(5)-nitroimidazole,
2 - (p - N - pyrrolidinylsulfonylphenyl)-4(5)-nitroimidazole,
2 - (p - N - morpholinylsulfonylphenyl)-4(5)-nitroimidazole,
2 - (p-NN-dimethylsulfonamidophenyl)-4(5)-nitroimidazole,
2-(m-methylthiophenyl)-4(5)-nitroimidazole,
2-(p-ethylthiophenyl)-4(5)-nitroimidazole,
2-(m-n-propylthiophenyl)-4(5)-nitroimidazole,
2-(p-isopropylthiophenyl)-4(5)-nitroimidazole,
2-(p-methylthiophenyl-4(5)-nitroimidazole,
2-(m-isopropionylaminophenyl)-4(5)-nitroimidazole,
2-(p-secbutyrylaminophenyl)-4(5)-nitroimidazole,
2-(m-valerylaminophenyl)-4(5)-nitroimidazole,
2-(p-n-butylthiophenyl)-4(5)-nitroimidazole,
2-(o-secbutylthiophenyl)-4(5)-nitroimidazole,
2-(p-propionylphenyl)-4(5)-nitroimidazole,
2-(p-ethylsulfonylphenyl)-4(5)-nitroimidazole,
2-(p-isopropylsulfonylphenyl)-4(5)-nitroimidazole,
2-(o-n-butylsulfonylphenyl)-4(5)-nitroimidazole,
2-(p-secbutylsulfonylphenyl)-4(5)-nitroimidazole,
2-(o-n-pentylsulfonylphenyl)-4(5)-nitroimidazole,
2-(m-methylsulfonylphenyl)-4(5)-nitroimidazole,
2-(p-acetylphenyl)-4(5)-nitroimidazole,
2-(p-propionylphenyl)-4(5)-nitroimidazole,
2-(o-valerylphenyl)-4(5)-nitroimidazole,
2-(p-benzoylphenyl)-4(5)-nitroimidazole,
2-(p-carbomethoxyphenyl)-4(5)-nitroimidazole,
2-(m-carboethoxyphenyl)-4(5)-nitroimidazole,
2-(p-carbo-n-propoxyphenyl)-4(5)-nitroimidazole,
2-(o-carboisopropoxyphenyl)-4(5)-nitroimidazole,
2-(p-carbo-n-butoxyphenyl)-4(5)-nitroimidazole,
2-(o-acetylphenyl)-4(5)-nitroimidazole,
2-(p-carboxamidophenyl)-4(5)-nitroimidazole,
2 - (p - NN-diisopropylcarboxamidophenyl)-4(5)-nitroimidazole,
2 - (p - NN - disecbutylcarboxamidophenyl)-4(5)-nitroimidazole,
2 - (p - NN-di-n-pentylcarboxamidophenyl)-4(5)-nitroimidazole,
2-(p-N-pyrrolidinylcarbonylphenyl)-4(5)-nitroimidazole,
2 - (p - N-morpholinylcarbonylphenyl)-4(5)-nitroimidazole, and
2 - (o - NN-diethylcarboxamidophenyl)-4(5)-nitroimidazole, there is obtained the corresponding Lewis acid: 4(5)-nitroimidazole equimolar complex.

Example 8

A solution of the boron trifluoride: 2-(p-fluorophenyl)-4(5)-nitroimidazole complex obtained from 0.544 g. (0.0026 m.) of 2-(p-fluorophenyl)-5-nitroimidazole and 0.30 ml. (0.0024 m.) of boron trifluoride etherate, in 10 ml. of nitromethane is connected to a gas burette and ethylene oxide added to the stirred solution for three hours at a temperature of 55–60° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate 0.366 g. of unreacted starting material. The chloroform extract is evaporated to dryness to afford 0.108 g. of 1-(2-hydroxyethyl)-2-(p-fluorophenyl)-5-nitroimidazole.

Example 9

A mixture of 3.1 g. (0.015 mole) of 2-(p-fluorophenyl)-4(5)-nitroimidazole and 2.25 g. (0.015 mole) of boron trifluoride etherate in 50 ml. of nitromethane is stirred at room temperature until the solid dissolves. A small amount of flocculent solid is removed by filtration and an additional small volume of nitro methane added to the filtrate. The clear filtrate is then concentrated to dryness under reduced pressure to give a crystalline residue of the boron trifluoride: 2 - (p-fluorophenyl)-4(5)-nitroimidazole complex.

This solid is dissolved in 30 ml. of glacial acetic acid. To the resulting solution there is added dropwise with stirring over a period of 30 minutes a solution of 7.5 ml. of liquid ethylene oxide in 7.5 ml. of n-hexane. The temperature of the reaction mixture is maintained at about 32–34° C. At the end of the addition the solvent is removed under reduced pressure and the residue dissolved in about 200 ml. of chloroform. The chloroform solution is extracted with four 40 ml. portions of 4 N ammonium hydroxide. The ammonium extracts are backwashed once with chloroform and then adjusted to pH 4–5 with concentrated hydrochloric acid. 0.79 gram of 2-(p-fluorophenyl)-4(5)-nitroimidazole precipitates and is recovered by filtration The chloroform solution is extracted with four 40 ml. portions of 2.5 N hydrochloric acid The acidic extracts are combined and adjusted to pH 5 with 11.7 N sodium hydroxide. 1 - (2 - hydroxyethyl)-2-(p-fluorophenyl)-5-nitroimidazole precipitates and is recovered by filtration, washed and dried. There are obtained 1.71 g. of product, M.P. 159–162° C.

Example 10

5.17 g. of 2-(p-fluorophenyl)-4(5)-nitroimidazole and 3.75 g. of boron trifluoride-ethyl etherate are mixed in 50 ml. of glacial acetic acid. This mixture is stirred at 25° C. for a few minutes and then a mixture of 14.4 g. of 1,2-butylene oxide in 32 ml. of hexane is added over a period of 2½–3 hours. The temperature is maintained at 25–30° C. during the addition. The reaction mixture is then concentrated to remove solvent and the residue dissolved in about 200 ml. of chloroform. The chloroform solution is extracted with four 60 ml. portions of 4 N ammonium hydroxide. The ammonia extracts are combined and acidified under reduced pressure to pH 5 with about 40 ml. of concentrated hydrochloric acid. The solid thus obtained is recovered by filtration and dried.

The chloroform solution is extracted with four 60 ml. portions of 2.5 N hydrochloric acid, and the combined acidic extracts adjusted to pH 5 under reduced pressure with about 40 ml. of concentrated sodium hydroxide. The solid product thus obtained is recovered by filtration at room temperature, washed and dried to give substantially pure 1-(2-hydroxybutyl)-2-(p-fluorophenyl)-5-nitroimidazole, M.P. 111–112° C.

Example 11

When the procedure of Example 10 is repeated using 11.6 g. of 1,2-propylene oxide in place of the butylene oxide, and the addition of oxide carried out over a period of 90 minutes, there is obtained 1-(2-hydroxypropyl)-2-(p-fluorophenyl)-5-nitroimidazole, M.P. 135–138° C. On recrystallization from aqueous ethanol the melting point is raised to 142–143° C.

Example 12

A mixture of 0.52 g. of 2-(p-fluorophenyl)-4(5)-nitroimidazole and 0.375 g. of boron trifluoride etherate in 5 ml. of glacial acetic acid is stirred at room temperature for a few minutes and there is then added to it 1.4 ml. of 1,3-trimethylene oxide and 0.6 ml. of hexane. The addition of oxide is carried out over a period of about 30 minutes, maintaining the temperature at 26–29° C. The mixture is then concentrated to dryness under reduced pressure and the residue dissolved in chloroform. The chloroform solution is extracted with four 6 ml. volumes of 4 N ammonium hydroxide. The chloroform solution is then extracted with four 6 ml. portions of 2.5 N hydrochloric acid. These acidic extracts are combined and adjusted to pH 5 under reduced pressure with concentrated sodium hydroxide. The solid forms slowly at room temperature. The suspension is chilled and the solid removed by filtration to give 1-(3-hydroxypropyl)-2-(p-fluorophenyl)-5-nitroimidazole, M.P. 97–102° C. Recrystallization from 1:2 ethanol water raises the melting point to about 110–113° C.

Example 13

1 - [2 - ($\beta$ - hydroxyethoxy) - ethyl] - 2 - (p - fluorophenyl)-5-nitroimidazole is obtained in the following manner:

512 milligrams of 1 - (2 - hydroxyethyl) - 2 - (p-fluorophenyl)-5-nitroimidazole obtained by the process of Example 2 but which has not been purified by recrystallization is dissolved in 25 ml. of chloroform and charged to a column (23 x 90 mm.) of 25 g. of silica gel suspended in ethyl ether. The column is developed with benzene and then with ether. On ether elution two product bands appear. The first and faster moving is substantially pure 1-(2 - hydroxyethyl) - 2 - (p - fluorophenyl) - 5 - nitroimidazole. The second smaller band is eluted with acetone. The acetone eluate is concentrated to dryness to give an oily residue which is crystallized. This product is recrystallized from a minimum volume of ethyl acetate, using a small amount of decolorizing charcoal. After removal of the charcoal the ethyl acetate solution is chilled overnight and the solid product recovered by filtration. It is washed with ethyl acetate and hexane and dried to give 1-[2-($\beta$-hydroxyethoxy) - ethyl] - 2 - (p - fluorophenyl) - 5-nitroimidazole, M.P. 107–108.5° C. This product may be further purified by recrystallization from ethanol. It possesses anti-parasitic activity against enterohepatitis and trichomoniasis.

Example 14

A solution of the aluminum trichloride: 2-(o-nitrophenyl)-4(5)-nitroimidazole complex obtained from 0.608 g. (0.0026 m.) of 2-(o-nitrophenyl)-5-nitroimidazole and 0.32 g. (0.0024 m.) of aluminum trichloride, in 10 ml. of dioxan is connected to a gas burette and ethylene oxide added to the stirred solution for 24 hours at a temperature of 15–25° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(o-nitrophenyl)-5-nitroimidazole.

In accordance with the above procedure but starting with 2-(m-nitrophenyl)-4(5)-nitroimidazole, 2-(p-nitrophenyl) - 4(5) - nitroimidazole, 2 - (3,5 - dinitrophenyl)- 4(5) - nitroimidazole, 2-(2,4 - dinitrophenyl) - 4(5)- nitroimidazole, 2 - (o - formylphenyl) - 4(5) - nitroimidazole in place of 2-(o-nitrophenyl)-4(5)-nitroimidazole, there is obtained the corresponding 1-(2'-hydroxyethyl) - 2 - (m - nitrophenyl) - 5 - nitroimidazole, 1 - (2'-hydroxyethyl) - 2 - (p - nitrophenyl) - 5 - nitroimidazole, 1-(2' - hydroxyethyl) - 2 - (3,5 - dinitrophenyl) - 5-nitroimidazole, 1 - (2' - hydroxyethyl) - 2 - (2,4 - dinitrophenyl)-5-nitroimidazole, and 1-(2'-hydroxyethyl)-2-(o-formylphenyl)-5-nitroimidazole.

Example 15

A solution of the titanium tetrachloride: 2-(o-cyanophenyl)-4(5)-nitroimidazole complex obtained from 0.556 g. (0.0026 m.) of 2-(o-cyanophenyl)-5-nitroimidazole and 0.46 g. (0.0024 m.) of titanium tetrachloride, in 10 ml. of ethyleneglycol dimethylether is connected to a gas burette and ethylene oxide added to the stirred solution for 24 hours at a temperature of 15–25° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(o-cyanophenyl)-5-nitroimidazole.

In accordance with the above procedure, but starting with 2-(m-cyanophenyl)-4(5)-nitroimidazole,
2-(p-cyanophenyl)-4(5)-nitroimidazole,
2-(p-formylaminophenyl)-4(5)-nitroimidazole,
2-(o-acetylaminophenyl)-4(5)-nitroimidazole in place of 2-(o-cyanophenyl)-4(5)-nitroimidazole, there is obtained the corresponding 1-(2'-hydroxyethyl)-2-(m-cyanophenyl)-5-
 nitroimidazole,
1-(2'-hydroxyethyl)-2-(p-cyanophenyl)-5-nitroimidazole,
1-(2'-hydroxyethyl)-2-(p-formylaminophenyl)-5-
 nitroimidazole, and
1-(2'-hydroxyethyl)-2-(o-acetylaminophenyl)-5-
 nitroimidazole.

Example 16

A solution of the stannic chloride: 2-(p-NN-dimethylsulfonamidophenyl)-4(5)-nitroimidazole complex obtained from 0.770 g. (0.0026 m.) of 2-(p-NN-dimethylsulfonamidophenyl)-5-nitroimidazole and 0.64 g. (0.0024 m.) of stannic chloride, in 10 ml. of benzene/diethyleneglycol dimethylether is connected to a gas burette and ethylene oxide added to the stirred solution for 24 hours at a temperature of 15–25° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(p-NN-dimethylsulfonamidophenyl)-5-nitroimidazole.

In accordance with the above procedure but starting with 2-(o-sulfonamidophenyl)-4(5)-nitroimidazole,
2-(m-benzenesulfonamidophenyl)-4(5)-nitroimidazole,
2-(o-NN-diethylsulfonamidophenyl)-4(5)-nitroimidazole,
2-(p-NN-diisopropylsulfonamidophenyl)-4(5)-nitroimidazole,
2-(p-NN-disecbutylsulfonamidophenyl)-4(5)-nitroimidazole,
2-(p-NN-di-n-pentylsulfonamidophenyl)-4(5)-nitroimidazole,
2-(p-N-pyrrolidinylsulfonylphenyl)4(5)-nitroimidazole,
2-(p-N-morpholinylsulfonylphenyl)-4(5)-nitroimidazole in place of 2-(p-NN-dimethylsulfonamidophenyl)-4(5)-nitroimidazole, there is obtained the corresponding 1-(2'-hydroxyethyl)2-(o-sulfonamidophenyl)-5-nitroimidazole,
1-(2'-hydroxyethyl)-2-(m-benzenesulfonamidophenyl)-5-nitroimidazole,
1-(2'-hydroxyethyl)-2-(o-NN-diethylsulfonamidophenyl)-5-nitroimidazole,
1-(2'-hydroxyethyl)-2-(p-NN-diisopropylsulfonamidophenyl)-5-nitroimidazole,
1-(2'-hydroxyethyl)-2-(p-NN-disecbutylsulfonamidophenyl)-5-nitroimidazole,
1-(2'-hydroxyethyl)-2-(p-NN-di-n-pentylsulfonamidophenyl)-5-nitroimidazole,
1-(2'-hydroxyethyl)-2-(p-N-pyrrolidinosulfonylphenyl)-5-nitroimidazole, and
1-(2'-hydroxyethyl)-2-(p-N-morpholinosulfonylphenyl)-5-nitroimidazole.

Example 17

A solution of the sulfur trioxide: 2-(p-methylthiophenyl)-4(5)-nitroimidazole complex obtained from .611 g. (0.0026 m.) of 2-(p-methylthiophenyl)-5-nitroimidazole and 0.19 g. (0.0024 m.) of sulfur trioxide, in 10 ml. of dioxan is connected to a gas burette and ethylene oxide added under pressure to the stirred solution for twenty-four hours at a temperature of 20–30° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(p-methylthiophenyl)-5-nitroimidazole.

In accordance with the above procedure but starting with 2-(m-methylthiophenyl)-4(5)-nitroimidazole,
2-(p-ethylthiophenyl)-4(5)-nitroimidazole,
2-(m-n-propylthiophenyl)-4(5)-nitroimidazole,
2-(p-isopropylthiophenyl)-4(5)-nitroimidazole in place of 2-(p-methylthiophenyl)-4(5)-nitroimidazole, there is obtained the corresponding 1-(2'-hydroxyethyl)-2-(m-methylthiophenyl)-5-nitroimidazole,
1-(2'-hydroxyethyl)-2-(p-ethylthiophenyl)-5-nitroimidazole,
1-(2'-hydroxyethyl)-2-(m-n-propylthiophenyl)-5-nitroimidazole, and
1-(2'-hydroxyethyl)-2-(p-isopropylthiophenyl)-5-nitroimidazole.

Example 18

A solution of the boron trifluoride: 2-(p-fluorophenyl)-4(5)-nitroimidazole complex obtained from 0.544 g. (0.0026 m.) of 2-(p-fluorophenyl)-5-nitroimidazole and 0.30 ml. (0.0024 m.) of boron trifluoride etherate, in 10 ml. of diethylether/ethanol(1:1) is connected to a gas burette and ethylene oxide added under pressure to the stirred solution for twenty-four hours at a temperature of 20–30° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl-2-(p-fluorophenyl)-5-nitroimidazole, M.P. 140–160° C. This product is heated on a steam bath for 90 minutes with 4 ml. of 2.5 N hydrochloric acid. The acidic solution is then neutralized with base to precipitate 1-(2-hydroxyethyl)-2-(p-fluorophenyl)-5-nitroimidazole. The product is isolated by filtration and dried to afford product.

Example 19

A solution of the titanium tetrachloride: 2-(p-propionylaminophenyl) - 4(5) - nitroimidazole complex obtained from 0.67 g. (0.0026 m.) of 2-(p-propionylaminophenyl)-5-nitroimidazole and 0.45 g. (0.0024 m.) of titanium tetrachloride, in 50 ml. of ethyl acetate is connected to a gas burette and ethylene oxide added under pressure to the stirred solution for twenty-four hours at a temperature of 20–30° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(p-propionylaminophenyl)-5-nitroimidazole.

In accordance with the above procedure but starting with 2 - (m - isopropionylaminophenyl) - 4(5) - nitroimidazole, 2-(p-secbutyrrylaminophenyl)-4(5)-nitroimidazole, 2 - (m - valerylaminophenyl) - 4(5) - nitroimidazole, 2-(p-n-butylthiophenyl)-4(5)-nitroimidazole, 2-(o-secbutylthiophenyl) - 4(5) - nitroimidazole in place of 2 - (p-propionylaminophenyl) - 4(5) - nitroimidazole, there is obtained the corresponding 1 - (2' - hydroxyethyl) - 2 - (m - isopropionylaminophenyl) - 5 - nitroimidazole, 1-(2' - hydroxyethyl) - 2 - (p - secbutyrylaminophenyl) - 5 - nitroimidazole, 1 - (2' - hydroxyethyl) - 2 - (m - valerylaminophenyl) - 5 - nitroimidazole, 1 - (2' - hydroxyethyl) - 2 - (p - n - butylthiophenyl) - 5 - nitroimidazole, and 1 - (2' - hydroxyethyl) - 2 - (o - secbutylthiophenyl)-5-nitroimidazole.

Example 20

A solution of the stannic chloride: 2-(m-methylsulfonylphenyl)-4(5)-nitroimidazole complex obtained from 0.694 g. (0.0026 m.) of 2-(m-methylsulfonylphenyl)-5-nitroimidazole and 0.54 g. (0.0024 m.) of stannic chloride, in 10 ml. of tetramethylenesulfone is connected to a gas burette and ethylene oxide added under pressure to the stirred solution for twenty-four hours at a temperature of 20–30° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1 - (2 - hydroxyethyl) - 2 - (m - methylsulfonylphenyl)-5-nitroimidazole.

In accordance with the above procedure but starting with 2 - (p - ethylsulfonylphenyl) - 4(5) - nitroimidazole, 2 - (p - isopropylsulfonylphenyl)-4(5) - nitroimidazole, 2 - (o - n - butylsulfonylphenyl) - 4(5) - nitroimidazole, 2 - (p - sec - butylsulfonylphenyl) - 4(5) - nitroimidazole, 2 - (o - n - pentylsulfonylphenyl) - 4(5) - nitroimidazole in place of 2 - (m - methylsulfonylphenyl) - 4(5) - nitroimidazole, there is obtained the corresponding 1 - (2'-hydroxyethyl) - 2 - (p - ethylsulfonylphenyl) - 5 - nitroimidazole, 1 - (2' - hydroxyethyl) - 2 - (p - isopropylsulfonylphenyl) - 5 - nitroimidazole, 1 - (2' - hydroxyethyl) - 2- (o - n - butylsulfonylphenyl) - 5 - nitroimidazole, 1 - (2' - hydroxyethyl) - 2 - (p-secbutylsulfonylphenyl) - 5 - nitroimidazole, and 1 - (2' - hydroxyethyl)-2-(o-n-pentylsulfonylphenyl)-5-nitroimidazole.

*Example 21*

A solution of the antimony pentachloride: 2-(o-acetylphenyl)-4(5)-nitroimidazole complex obtained from 0.60 g. (0.0026 m.) of 2-(o-acetylphenyl)-5-nitroimidazole and 0.72 g. (0.0024 m.) of antimony pentachloride, in 10 ml. of ethylene dichloride/nitromethane (1:1) is connected to a gas burette and ethylene oxide added under pressure to the stirred solution for twenty-four hours at a temperature of 15–25° C. When the gas addition is complete, the reaction mixture is evaporated to dryness in vacuo. The residue is diluted with 10 ml. of water and made basic with dilute aqueous sodium hydroxide. This mixture is extracted with 75 ml. of chloroform. The alkaline solution is then acidified to precipitate unreacted starting material. The chloroform extract is evaporated to dryness to afford 1-(2-hydroxyethyl)-2-(o-acetylphenyl)-5-nitroimidazole.

In accordance with the above procedure but starting with 2-(p-acetylphenyl)-4(5)-nitroimidazole,
2-(p-propionylphenyl)-4(5)-nitroimidazole,
2-(o-valerylphenyl)-4(5)-nitroimidazole,
2-(p-benzoylphenyl)-4(5)-nitroimidazole,
2-(p-carbomethoxyphenyl)-4(5)-nitroimidazole,
2-(m-carboethoxyphenyl)-4(5)-nitroimidazole,
2-(p-carbo-n-propoxyphenyl)-4(5)-nitroimidazole,
2-(o-carboisopropoxyphenyl)-4(5)-nitroimidazole,
2-(p-carbo-n-butoxyphenyl)-4(5)-nitroimidazole in place of 2-(o-acetylphenyl)-4(5)nitroimidazole, there is obtained the corresponding 1-(2'-hydroxyethyl)-2(p-acetylphenyl)-5-nitroimidazole,
1-(2'-hydroxyethyl)-2-(p-propionylphenyl)-5-nitroimidazole,
1-(2'-hydroxyethyl)-2-(o-valerylphenyl)-5-nitroimidazole,
1-(2'-hydroxyethyl)-2-(p-benzoylphenyl)-5-nitroimidazole,
1-(2'-hydroxyethyl)-2-(p-carbomethoxyphenyl)-5-nitroimidazole,
1-(2'-hydroxyethyl)-2-(m-carboethoxyphenyl)-5-nitroimidazole,
1-(2'-hydroxyethyl)-2-(p-carbo-n-propoxyphenyl)-5-nitroimidazole,
1-(2'-hydroxyethyl)-2-(o-carboisopropoxyphenyl)-5-nitroimidazole, and
1-(2'-hydroxyethyl)-2-(p-carbo-n-butoxyphenyl)-5-nitroimidazole.

*Example 22*

14.5 g. (0.25 m.) of liquid 1,3-epoxypropane are added over a period of 40 minutes to a stirred mixture of 6.50 g. (0.025 m.) of 2-(p-NN-dimethylcarboxamidophenyl)-4(5)-nitroimidazole and 2.0 g. (0.025 m.) of sulfur trioxide and 50 ml. of glacial acetic acid. During the epoxypropane addition, the temperature of the reaction mixture is maintained at 25–30° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined and washed with 100 ml. of chloroform. They are then acidified under reduced pressure to pH 5 with concentrated hydrochloric acid. 2 - (p - NN - dimethylcarboxamidophenyl) - 4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1 - (3 - hydroxypropyl) - 2 - (p - NN - dimethylcarboxamidophenyl)-5-nitroimidazole precipitates. The mixture is cooled and the solid removed by filtration and dried.

In accordance with the above procedure, but starting with 2-(p-carboxamidophenyl)-4(5)-nitroimidazole,
2-(p-NN-diisopropylcarboxamidophenyl)-4(5)-nitroimidazole,
2-(p-NN-disecbutylcarboxamidophenyl)-4(5)-nitroimidazole,
2-(p-NN-di-n-pentylcarboxamidophenyl)-4(5)-nitroimidazole,
2-(p-N-pyrrolidinylcarbonylphenyl)-4(5)-nitroimidazole,
2-(p-N-morpholinylcarbonylphenyl)-4(5)-nitroimidazole, in place of 2-(o-NN-diethylcarboxamidophenyl)-4(5)-nitroimidazole, there is obtained the corresponding 1-(3-hydroxypropyl)-2-(carboxamidophenyl)-5-nitroimidazole,
1-(3-hydroxypropyl)-2-(p-NN-diisopropylcarboxamidophenyl)-5-nitroimidazole,
1-(3-hydroxypropyl)-2-(p-NN-disecbutylcarboxamidophenyl)-5-nitroimidazole,
1-(3-hydroxypropyl)-2-(p-NN-di-n-pentylcarboxamidophenyl)-5-nitroimidazole,
1-(3-hydroxypropyl)-2-(p-N-pyrrolidinylcarbonylphenyl)-5-nitroimidazole, and
1-(3-hydroxypropyl)-2-(p-N-morpholinylcarbonylphenyl)-5-nitroimidazole.

In accordance with the above procedure but using 1,3-epoxybutane in place of 1,3-epoxypropane there is obtained the corresponding 1-(3-hydroxybutyl)-5-nitroimidazole.

*Example 23*

21.5 g. (0.25 m.) of liquid 1,2-pentylene oxide are added over a period of 40 minutes to a stirred mixture of 5.07 g. (0.025 m.) of 2-(m-tolylphenyl)-4(5)-nitroimidazole and 3.25 ml. (0.025 m.) of boron trifluoride etherate and 50 ml. of glacial acetic acid. During the 1,2-pentylene oxide addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(m-tolylphenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-(2-hydroxypentyl)-2-(m-tolylphenyl)-5-nitroimidazole precipitates. The mixture is cooled and the solid removed by filtration and dried.

In accordance with the above procedure, but starting with 2-(o-tolyl)-4(5)-nitroimidazole,
2-(p-tolyl)-4(5)-nitroimidazole,
2-(o-ethylphenyl)-4(5)-nitroimidazole,
2-(p-ethylphenyl)-4(5)-nitroimidazole,
2-(o-butylphenyl)-4(5)-nitroimidazole,
2-(p-butylphenyl)-4(5)-nitroimidazole,
2-(p-diphenyl)-4(5)-nitroimidazole,
2-(m-diphenyl)-4(5)-nitroimidazole,
2-(p-methoxyphenyl)-4(5)-nitroimidazole,
2-(m-methoxyphenyl)-4(5)-nitroimidazole,
2-(o-methoxyphenyl)-4(5)-nitroimidazole,
2-(p-ethoxyphenyl)-4(5)-nitroimidazole,
2-(p-isopropoxyphenyl)-4(5)-nitroimidazole,
2-(o-n-butoxyphenyl-4(5)-nitroimidazole,
2-(p-n-butoxyphenyl)-4(5)-nitroimidazole,
2-(p-secbutoxyphenyl)-4(5)-nitroimidazole, in place of 2-(m-tolyl)-4(5)-nitroimidazole,
there is obtained the corresponding
1-(2'-hydroxypentyl)-2-(o-tolyl)-5-nitroimidazole,
1-(2'-hydroxypentyl)-2-(p-tolyl)-5-nitroimidazole,
1-(2'-hydroxypentyl)-2-(o-ethylphenyl)-5-nitroimidazole,
1-(2'-hydroxypentyl)-2-(p-ethylphenyl)-5-nitroimidazole,
1-(2'-hydroxypentyl)-2-(o-butylphenyl)-5-nitroimidazole,
1-(2'-hydroxypentyl)-2-(p-butylphenyl)-5-nitroimidazole,
1-(2'-hydroxypentyl)-2-(p-diphenyl)-5-nitroimidazole,
1-(2'-hydroxypentyl)-2-(m-diphenyl)-5-nitroimidazole,
1-(2'-hydroxypentyl)-2-(p-methoxyphenyl)-5-nitroimidazole,
1-(2'-hydroxypentyl)-2-(m-methoxyphenyl)-5-nitroimidazole,
1-(2'-hydroxypentyl)-2-(o-methoxyphenyl)-5-nitroimidazole,
1-(2'-hydroxypentyl)-2-(p-ethoxyphenyl)-5-nitroimidazole,
1-(2'-hydroxypentyl)-2-(p-isopropoxyphenyl)5-nitroimidazole,
1-(2'-hydroxypentyl)-2-(o-n-butoxyphenyl)-5-nitroimidazole,
1-(2'-hydroxypentyl)-2-(p-n-butoxyphenyl)-5-nitroimidazole, and
1-(2'-hydroxypentyl)-2-(p-secbutoxyphenyl)-5-nitroimidazole.

*Example 24*

17.8 g. (0.25 m.) of 2,3-epoxypropionamide are added over a period of 40 minutes to a stirred mixture of 7.07 g. (0.025 m.) of 2 - (m - chloroacetamidophenyl) - 4(5)- nitroimidazole and 3.25 ml. (0.025 m.) of boron trifluoride etherate and 50 ml. of glacial acetic acid. During the 2,3-epoxypropionamide addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(m-chloroacetamidophenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-[2'-(m-chloroacetamidophenyl) - 5 - nitroimidazole]yl-3-hydroxypropionamide precipitates. The mixture is cooled and the solid removed by filtration and dried.

In accordance with the above procedure, but starting with 2-(chloropropionamidophenyl)-4(5)-nitroimidazole,
2-(trifluoroacetamidophenyl)-4(5)-nitroimidazole,
2-(propionamidomethylphenyl)-4(5)-nitroimidazole, and
2-(valeramidoethylphenyl)-4(5)-nitroimidazole, in place of 2-(m-chloroacetamidophenyl)-4(5)-nitroimidazole,
there is obtained the corresponding
1-[2'-(chloropropionamidophenyl)-5'-nitroimidazole]yl-3-hydroxypropionamide,
1-[2'-(trifluoroacetamidophenyl)-5'-nitroimidazole]yl-3-hydroxypropionamide,
1-[2'-(propionamidomethylphenyl)-5'-nitroimidazole]yl-3-hydroxypropionamide, and
1-[2'-(valeramidoethylphenyl)-5'-nitroimidazole]yl-3-hydroxypropionamide.

*Example 25*

25.5 g. (0.25 m.) of methyl-2,3-epoxypropionate are added over a period of 40 minutes to a stirred mixture of 5.85 g. (0.025 m.) of 2-(m-carboxyphenyl)-4(5)-nitroimidazole and 3.25 ml. (0.025 m.) of boron trifluoride etherate and 50 ml. of glacial acetic acid. During the methyl-2,3-epoxypropionate addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2 - (m - carboxyphenyl) - 4(5)- nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1 - [2' - (m-carboxyphenyl)-5'-nitroimidazole]yl methyl-3-hydroxypropionate precipitates. The mixture is cooled and the solid removed by filtration and dried.

In accordance with the above procedure, but starting with 2 - (formylphenyl) - 4(5) - nitroimidazole, and 2-(cyanatophenyl)-4(5)-nitroimidazole, in place of 2-(m-carboxyphenyl) - 4(5) - nitroimidazole, there is obtained the corresponding 1 - [2' - (formylphenyl)-5'-nitroimidazole]yl methyl-3-hydroxypropionate and 1-[2'-cyanatophenyl)-5-nitroimidazole]yl methyl-3-hydroxypropionate.

In accordance with the above procedure but using ethyl - 2,3-epoxypropionate, propyl-2,3-epoxypropionate, butyl-2,3-epoxypropionate and pentyl-2,3-epoxypropionate in place of methyl-2,3-epoxypropionate and starting with any of the aforementioned 4(5)-nitroimidazoles, there is obtained the corresponding 1 - [2' - substituted - 5'-nitroimidazole]yl lower-alkyl-3-hydroxypropionate.

*Example 26*

17.8 g. (0.25 m.) of 2,3-epoxypropionamide are added over a period of 40 minutes to a stirred mixture of 7.03 g. (0.025 m.) of 2-(m-thioncarbamoylthiophenyl)-4(5)-nitroimidazole and 3.25 ml. (0.025 m.) of boron trifluoride etherate and 50 ml. of glacial acetic acid. During the 2,3-epoxypropionamide addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(m-thioncarbamoylthiophenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-[2'-(m-thioncarbamoylthiophenyl) - 5'-nitroimidazole]yl-3-hydroxypropionamide precipitates. The mixture is cooled and the solid removed by filtration and dried.

In accordance with the above procedure, but starting with 2-(thiondimethylcarbamoylthiophenyl)-4(5)-nitroimidazole,
2-(thiondiethylcarbamoylthiophenyl)-4(5)-nitroimidazole,
2-(thiondipropylcarbamoylthiophenyl)-4(5)-nitroimidazole,
2-(thionbutylcarbamoylthiophenyl)-4(5)-nitroimidazole,
2-(thionpentylcarbamoylthiophenyl)-4(5)-nitroimidazole,
2-(propoxythiocarbonylthiophenyl)-4(5)-nitroimidazole, and
2-(methoxythiocarbonylthiophenyl)-4(5)-nitroimidazole, in place of 2-(m-thioncarbamoylthiophenyl)-4(5)-nitroimidazole, there is obtained the corresponding 1-[2'-(thiondimethylcarbamoylthiophenyl)-5'-nitroimidazole]yl-3-hydroxypropionamide,
1-[2'-thiondiethylcarbamoylthiophenyl)-5'-nitroimidazole]yl-3-hydroxypropionamide,
1-[2'-(thiondipropylcarbamoylthiophenyl)-5'-nitroimidazole]yl-3-hydroxypropionamide,
1-[2'-(thionbutylcarbamoylthiophenyl)-5'-nitroimidazole]yl-3-hydroxypropionamide,
1-[2'-(thionpentylcarbamoylthiophenyl)-5'-nitroimidazole]yl-3-hydroxypropionamide,
1-[2'-(propoxythiocarbonylthiophenyl)-5'-nitroimidazole]yl-3-hydroxypropionamide, and
1-[2'-(methoxythiocarbonylthiophenyl)-5'-nitroimidazole]yl-3-hydroxypropionamide.

*Example 27*

17.3 g. (0.25 m.) of 2,3-epoxypropionitrile are added over a period of 40 minutes to a stirred mixture of 7.05 g. (0.025 m.) of 2-(p-diethoxymethylphenyl)-4(5)-nitroimidazole and 3.25 ml. (0.025 m.) of boron trifluoride etherate and 50 ml. of glacial acetic acid. During the 2,3-epoxypropionitrile addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2 - (p - diethoxymethylphenyl) - 4(5) - nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-[2'-(p-diethoxymethylphenyl) - 5 - nitroimidazole]yl-3-hydroxypropionitrile precipitates. The mixture is cooled and the solid removed by filtration and dried.

In accordance with the above procedure, but starting with 2-(phenoxycarbonyloxymethylphenyl)-4(5)-nitroimidazole,
2-(dipropoxybutylphenyl)-4(5)-nitroimidazole,
2-(methoxyethylphenyl)-4(5)-nitroimidazole,
2-(butoxymethylphenyl)-4(5)-nitroimidazole,
2-(trifluoromethylphenyl)-4(5)-nitroimidazole,
2-(chloromethylphenyl)-4(5)-nitroimidazole and
2-(trichloroethylphenyl)-4(5)-nitroimidazole in place of 2-(p-diethoxymethylphenyl)-4(5)-nitroimidazole, there is obtained the corresponding 1-[2'-(phenoxycarbonyloxymethylphenyl)-5'-nitroimidazole]yl-3-hydroxypropionitrile,
1-[2'-(dipropoxybutylphenyl)-5'-nitroimidazole]yl-3-hydroxypropionitrile,
1-[2'-(methoxyethylphenyl)-5'-nitroimidazole]yl-3-hydroxypropionitrile,
1-[2'-(butoxymethylphenyl)-5'-nitroimidazole]yl-3-hydroxypropionitrile,
1-[2'-(trifluoromethylphenyl)-5'-nitroimidazole]yl-3-hydroxypropionitrile,
1-[2'-(chloromethylphenyl)-5'-nitroimidazole]yl-3-hydroxypropionitrile, and
1-[2'-(trichloroethylphenyl)-5'-nitroimidazole]yl-3-hydroxypropionitrile.

*Example 28*

21.5 g. (0.25 m.) of 2-methyl-2,3-epoxypropionic acid are added over a period of 40 minutes to a stirred mixture of 5.97 g. (0.025 m.) of 2-(o-chloromethoxyphenyl)-4(5)-nitroimidazole and 3.25 ml. (0.025 m.) of boron trifluoride etherate and 50 ml. of glacial acetic acid. During the 2-methyl-2,3-epoxypropionic acid addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(o-chloromethoxyphenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-[2'-(o - chloromethoxyphenyl)-5'-nitroimidazole]yl - 2-methyl-2-hydroxypropionic acid precipitates. The mixture is cooled and the solid removed by filtration and dried.

In accordance with the above procedure, but starting with 2-(bromoethoxyphenyl)-4(5)-nitroimidazole,
2-(chloropropoxyphenyl)-4(5)-nitroimidazole,
2-(carbamoylbutoxyphenyl)-4(5)-nitroimidazole,
2-(carbamoylethoxyphenyl)-4(5)-nitroimidazole,
2-(thioncarbamoylethoxyphenyl(-4(5)-nitroimidazole,
2-(thioncarbamoylbutoxyphenyl)-4(5)-nitroimidazole,
2-(butoxyphenyl)-4(5)-nitroimidazole, and
2-(propionoxyphenyl)-4(5)-nitroimidazole, in place of 2-(o-chloromethoxyphenyl)-4(5)-nitroimidazole, there is obtained the corresponding 1-[2'-(bromoethoxyphenyl)-5'-nitroimidazole]yl-2-methyl-2-hydroxypropionic acid,
1-[2'-(chloropropoxyphenyl)-5'-nitroimidazole]yl-2-methyl-2-hydroxypropionic acid,
1-[2'-(carbamoylbutoxyphenyl)-5'-nitroimidazole]yl-2-methyl-2-hydroxypropionic acid,
1-[2'-(carbamoylethoxyphenyl)-5'-nitroimidazole]yl-2-methyl-2-hydroxypropionic acid,
1-[2'-(thioncarbamoylethoxyphenyl)-5'-nitroimidazole]yl-2-methyl-2-hydroxypropionic acid,
1-[2'-(thioncarbamoylbutoxyphenyl)-5'-nitroimidazole]yl-2-methyl-2-hydroxypropionic acid,
1-[2'-(butoxyphenyl)-5'-nitroimidazole]yl-2-methyl-2-hydroxypropionic acid, and
1-[2'-(propionoxyphenyl)-5'-nitroimidazole]yl-2-methyl-2-hydroxypropionic acid.

*Example 29*

33.5 g. (0.25 m.) of 1,2-epoxy-3-phenoxypropane are added over a period of 40 minutes to a stirred mixture of 5.68 g. (0.025 m.) of 2-(p-propenylphenyl)-4(5)-nitroimidazole and 3.25 ml. (0.025 m.) of boron trifluoride etherate and 50 ml. of glacial acetic acid. During the 1,2-epoxy-3-phenoxypropane addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(p-propenylphenyl) - 4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-(2-hydroxy-3-phenoxypropyl) - 2 - (p-propenylphenyl)-5-nitroimidazole precipitates. The mixture is cooled and the solid removed by filtration and dried.

In accordance with the above procedure, but starting with 2-(butenylphenyl)-4(5)-nitroimidazole,
2-(pentenylphenyl)-4(5)-nitroimidazole,
2-(chloroethenylphenyl)-4(5)-nitroimidazole,
2-(trifluoroethenylphenyl)-4(5)-nitroimidazole,
2-(phenyldiazophenyl)-4(5)-nitroimidazole,
2-(furylphenyl)-4(5)-nitroimidazole, and
2-(thienylphenyl)-4(5)-nitroimidazole, in place of 2-(p-propenylphenyl)-4(5)-nitroimidazole, there is obtained the corresponding 1-(2-hydroxy-3-phenoxypropyl)-2-(butenylphenyl)-5-nitroimidazole,
1-(2-hydroxy-3-phenoxypropyl)-2-(pentenylphenyl)-5-nitroimidazole,
1-(2-hydroxy-3-phenoxypropyl)-2-(chloroethenylphenyl)-5-nitroimidazole,
1-(2-hydroxy-3-phenoxypropyl)-2-trifluoroethenylphenyl)-5-nitroimidazole,
1-(2-hydroxy-3-phenoxypropyl)-2-(phenyldiazophenyl)-5-nitroimidazole,
1-(2-hydroxy-3-phenoxypropyl)-2-(furylphenyl)-5-nitroimidazole, and
1-(2-hydroxy-3-phenoxypropyl)-2-(thienylphenyl)-5-nitroimidazole.

*Example 30*

25.0 g. (0.25 m.) of 1,2-epoxy-3-isopropoxypropane are added over a period of 40 minutes to a stirred mixture of 6.18 g. (0.025 m.) of 2-thiocyanophenyl)-4(5)-nitroimidazole and 3.25 ml. (0.025 m.) of boron trifluoride etherate and 50 ml. of glacial acetic acid. During the 1,2-epoxy-3-isopropoxypropane addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(thiocyanophenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-(2-hydroxy-3-isopropoxypropyl)-2 - (p - thiocyanophenyl)-5-nitroimidazole precipitates. The mixture is cooled and the solid removed by filtration and dried.

In accordance with the above procedure, but starting with 2-(thiocarbamoyloxyphenyl)-4(5)-nitroimidazole,
2-(dimethylcarbamoyloxymethylphenyl)-4(5)-nitroimidazole,
2-(diethylcarbamoyloxymethylphenyl)-4(5)-nitroimidazole,
2-(dipropoxycarbamoyloxymethylphenyl)-4(5)-nitroimidazole,
2-(dimethylthioncarbamoyloxymethylphenyl)-4(5)-nitroimidazole,
2-(diethylthioncarbamoyloxymethylphenyl)-4(5)-nitroimidazole, and
2-(dipropoxythioncarbamoyloxymethylphenyl)-4(5)-nitroimidazole, in place of
2-(p-thiocyanophenyl)-4-(5)-nitroimidazole, there is obtained the corresponding 1-(2-hydroxy-3-isopropoxypropyl)-2-(thiocarbamoyloxyphenyl)-5-nitroimidazole,
1-(2-hydroxy-3-isopropoxypropyl)-2-(dimethylcarbamoyloxymethylphenyl)-5-nitroimidazole,
1-(2-hydroxy-3-isopropoxypropyl)-2-(diethylcarbamoyloxymethylphenyl)-5-nitroimidazole,
1-(2-hydroxy-3-isopropoxypropyl)-2-(dipropoxycarbamoyloxymethylphenyl)-5-nitroimidazole,
1-(2-hydroxy-3-isopropoxypropyl)-2-(dimethylthioncarbamoyloxymethylphenyl)-5-nitroimidazole,
1-(2-hydroxy-3-isopropoxypropyl)-2-(diethylthioncarbamoyloxymethylphenyl)-5-nitroimidazole, and
1-(2-hydroxy-3-isopropoxypropyl)-2-(dipropoxythioncarbamoyloxymethylphenyl)-5-nitroimidazole,

*Example 31*

18.5 g. (0.25 m) of 2,3-epoxypropanol are added over a period of 40 minutes to a stirred mixture of 6.5 g. (0.025 m.) of 2-(m-methylsulfinylphenyl)-4(5)-nitroimidazole and 3.25 ml. (0.025 m.) of boron trifluoride etherate and 50 ml. of glacial acetic acid. During the 2,3-epoxypropanol addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(m-methylsulfinylphenyl) - 4(5) - nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-(2,3-dihydroxypropyl)-2 - (m - methylsulfinylphenyl)-5-nitroimidazole precipitates. The mixture is cooled and the solid removed by filtration and dried.

In accordance with the above procedure, but starting with 2-(ethylsulfinylphenyl)-4(5)-nitroimidazole,
2-(butylsulfinylphenyl)-4(5)-nitroimidazole, and
2-(pentylsulfinylphenyl)-4(5)-nitroimidazole, in place of 2-(m-methylsulfinylphenyl)-4(5)-nitroimidazole, there is obtained the corresponding 1-(2,3-dihydroxypropyl)-2-(ethylsulfinylphenyl)-
  5-nitroimidazole,
1- 2,3-dihydroxypropyl)-2-(butylsulfinylphenyl)-
  5-nitroimidazole, and
1-(2,3-dihydroxypropyl)-2-(pentylsulfinylphenyl)-
  5-nitroimidazole.

Example 32

18.0 g. (0.25 m.) of 2,3-epoxypropionaldehyde are added over a period of 40 minutes to a stirred mixture of 6.93 g. (0.025 m.) of 2-(p-dimethylcarbamoyloxyphenyl)-4(5)-nitroimidazole and 3.25 ml. (0.025 m.) of boron trifluoride etherate and 50 ml. of glacial acetic acid. During the 2,3-epoxypropionaldehyde addition, the temperature of the reaction mixture is maintained at 20–35° C. At the end of the addition, the mixture is concentrated at reduced pressure to dryness, and the residue dissolved in 200 ml. of chloroform. The chloroform solution is extracted with four 50 ml. portions of 4 N ammonium hydroxide. The ammonia extracts are separated, combined, and washed with 100 ml. of chloroform. They are then acidified under reduced pressure to pH 5 with concentrated hydrochloric acid. 2-(p-dimethylcarbamoyloxyphenyl)-4(5)-nitroimidazole precipitates. It is recovered by filtration and dried.

The chloroform solutions and washes are combined and extracted with four 62 ml. portions of 2.2 N hydrochloric acid. The acidic extracts are combined and adjusted to about pH 5 with 42 ml. of 11.2 N sodium hydroxide. 1-[2 - (p - dimethylcarbamoyloxyphenyl) - 5 - nitroimidazole]yl-2-hydroxypropionaldehyde precipitates. The mixture is cooled and the solid removed by filtration and dried.

In accordance with the above procedure but starting with 2-(dibutylcarbamoyloxyphenyl)-4(5) - nitroimidazole, 2-(diethylthioncarbamoyloxyphenyl) - 4(5) - nitroimidazole, and 2 - (dipentylthioncarbamoyloxyphenyl)-4(5)-nitroimidazole, in place of 2-(dimethylcarbamoyloxyphenyl)-4(5)-nitroimidazole, there is obtained the corresponding 1-[2'-(dibutylcarbamoyloxyphenyl)-5'-nitroimidazole]yl-
  2-hydroxypropionaldehyde,
1-[2'-(diethylthioncarbamoyloxyphenyl)-5'-nitroimidazole]yl-2-hydroxypropionaldehyde, and
1-[2'-(dipentylthioncarbamoyloxyphenyl)-5'-nitroimidazole]yl-2-hydroxypropionaldehyde.

Example 33

A solution of 2.7 g. (0.025 mole) of 2-p-fluorophenyl-4(5)-nitroimidazole and 3.75 g., 3.3 ml., (0.025 mole) of boron trifluoride:ethyletherate in 50 ml. of glacial acetic acid are stirred at 25° C. 18.5 g. (0.02 mole) of epichlorohydrin are added over a period of 40–45 minutes with stirring. The temperature of the reaction mixture rises to about 30° C. The reaction mixture is then concentrated under reduced pressure and the residue dissolved in chloroform and extracted with 4-N-aqueous ammonium hydroxide, and backwashed once with chloroform. The chloroform extracts are combined and washed with 2.5 N aqueous hydrochloric acid. The acid extract is placed under reduced pressure to remove any dissolved chloroform and the acidity of the solution adjusted to circa pH 5 by the addition of 50% aqueous sodium hydroxide solution. 3-[2-(p-fluorophenyl)-5-nitroimidazole-1-yl]-1-chloropropan-2-ol separates as a gum which may then be recrystallized from aqueous alcohol, M.P. 128–131° C.

In accordance with the above procedure but using as the oxide reactant epibromohydrin, 2,3-epoxypropanol, 2,3-epoxypropionaldehyde, ethyl-2,3-epoxypropionate, 2,3-epoxypropionitrile, 2,3-epoxypropionamide, 2,3-epoxypropionic acid, 2-methyl-2-epoxypropionic acid, 1,2-epoxy-3-isopropoxypropane, and 1,2-epoxy-3-phenoxypropane, in place of epichlorohydrin, there will be obtained the corresponding 3-[2-(p-fluorophenyl)-5-nitroimidazole - 1-yl]-1-bromopropan-2-ol, 3-[2-(p-fluorophenyl)-5-nitroimidazole - 1-yl]-propane-1,2-diol, 3-[2-(p-fluorophenyl) - 5 - nitroimidazole-1-yl]-2-hydroxypropionaldehyde, ethyl-3-[2-(p-fluorophenyl)-5-nitroimidazole-1-yl]-2 - hydroxypropionate, 3 - [2-(p-fluorophenyl)-5-nitroimidazole-1-yl]-2-hydroxypropionitrile, 3 - [2-(p-fluorophenyl) - 5-nitroimidazole-1-yl]-2-hydroxypropionamide, 3-[2-(p-fluorophenyl-5-nitroimidazole-1-yl]-2 - hydroxypropionic acid and 3 - [2-(p-fluorophenyl)-5-nitroimidazole-1-yl]-2-hydroxy-2-methylpropionic acid, 1 - (2'-hydroxy-3-isopropoxypropyl)-2-(p-fluorophenyl) - 5-nitroimidazole and 1 - (2'-hydroxy-3-phenoxypropyl)-2-(p-fluorophenyl)-5-nitroimidazole.

The foregoing examples illustrate in detail the preparation of certain specific 1-(hydroxyalkylated) 2-phenyl (and substituted phenyl)-5-nitroimidazoles by the direct hydroxyalkylation process of the invention. Other compounds whose synthesis in good yield is made possible by this novel process, typical of which are these specifically enumerated in the foregoing descriptive portion, are prepared in like manner from the appropirate epoxide and Lewis acid: nitroimidazole equimolar complex.

The starting materials used in the process of this invention are made from benzonitrile or a substituted benzonitrile by converting said nitrile to a benzimidate and reacting the latter compound with amino acetaldehyde diethyl acetal to produce a 2-phenyl (or substituted phenyl) imidazole. This latter compound is then reacted with nitric acid and acetic anhydride to afford the 2-phenyl (or substituted phenyl)-4(5)-nitroimidazole. This method is illustrated below for the synthesis of 2-(p-fluorophenyl)-4(5)-nitroimidazole but is equally applicable to making other starting materials:

To 1 l. of ethanol saturated with hydrogen chloride is added 75 gm. of p-fluorobenzonitrile. The resulting solution is allowed to stand overnight in an ice bath. The ethanol is then evaporated in vacuo giving ethyl-4-fluorobenzimidate hydrochloride.

To 10 gm. of the imino ether in 10 ml. of methanol is added 6.65 gm. of amino acetaldehyde diethyl acetal in 10 ml. of methanol. The resulting solution is allowed to stand at room temperature for 24 hours and is then evaporated in vacuo. Concentrated sulfuric acid (14.5 gm.) is added dropwise with stirring to the oil residue in an ice bath. The mixture is slowly warmed to room temperature and then quenched over ice and concentrated sodium hydroxide. The mixture is then extracted with chloroform and evaporated. The residue is dissolved in hot benzene and treated with charcoal and evaporated to dryness. The oily residue is dissolved in acetone, treated with charcoal, filtered while warm and evaporated to a small volume. Benzene is then added and evaporated and the residue is cooled on ice giving crystals of 2-(4'-fluorophenyl) imidazole; M.P. 196–198° C.

6 gm. of 2-(4'-fluorophenyl) imidazole is added to 1.7 ml. of concentrated nitric acid in 75 ml. of acetic anhydride in an ice bath. The reaction mixture is warmed over steam for 30 minutes, poured over crushed ice and the resulting solid is filtered. Recrystallization from acetone-ether gives 2-(4'-fluorophenyl)-4-nitroimidazole; M.P. 224–225° C.

Alternatively, the starting materials may be obtained by reacting together benzaldehyde or a substituted benzaldehyde with glyoxal to give 2-phenyl (or substituted phenyl) imidazole, and treating this latter substance with nitric acid in the presence of fuming sulfuric acid. This method is illustrated below for the preparation of 2-(o-nitrophenyl)-4(5)-nitroimidazole and is applicable to making other starting materials:

To 250 ml. of ethanol and 33 ml. of 30% glyoxal is added 15.1 gm. of o-nitrobenzaldehyde. The mixture is stirred rapidly and 600 ml. of ammonium hydroxide is added with stirring. The stirring is conducted for 72 hours at room temperature and the ethanol is then evaporated in vacuo. The mixture is then extracted with two 1 l. portions of chloroform. The chloroform extracts are combined and extracted with three 250 ml. portions of 2.5 N hydrochloric acid. The acid extracts are made alkaline with 11.6 N sodium hydroxide and are then extracted with chloroform. The chloroform extract is dried, filtered and evaporated to dryness giving 2-(2'-nitrophenyl) imidazole; M.P. 191–192° C.

375 mg. of 2-(2'-nitrophenyl) imidazole is added in small portions to 0.1 ml. of nitric acid (specific gravity 1.5) in 5 ml. of 30% fuming sulfuric acid. The reaction mixture is stirred for 25 minutes in an ice bath and heated over steam for 20 minutes. After cooling the reaction mixture is poured over crushed ice and the crystalline material which forms is filtered and washed with water. Recrystallization from ethyl acetate gives 2-(2'-nitrophenyl)-4-nitroimidazole; M.P. 242–243° C.

Any departure from the above description which conforms to the present invention is intended to be included within the scope of the claims.

What is claimed is:

1. A process for the preparation of 1(A-hydroxyalkylated) 2-aryl-5-nitroimidazoles which comprises sequentially reacting a 2-aryl-4(5)-nitroimidazole with a Lewis acid from the group consisting of boron trifluoride, sulfur trioxide, stannic chloride, titanium tetrachloride, aluminum trichloride, and antimony pentachloride and a compound selected from the group consisting of 1,A-epoxyloweralkanes and 1,A-epoxy substituted loweralkanes when A is 2 or 3.

2. A process according to claim 1 wherein substantially equimolar amounts of 2-aryl-4(5)-nitroimidazole and the Lewis acid are employed.

3. A process according to claim 2 wherein the equimolar Lewis acid: 2-aryl-4(5)-nitroimidazole complex is first isolated and then treated with the epoxide.

4. A process according to claim 1 wherein the epoxide is 1,2-epoxyethane, 1,2-epoxypropane, 1,2-epoxybutane, 1,3-epoxypropane, 1,3-epoxybutane, 1,2-epoxypentane, epichlorohydrin, epibromohydrin, 2,3-epoxypropanol, 2,3-epoxypropionaldehyde, ethyl-2,3-epoxypropionate, 2,3-epoxypropionitrile, 2,3-epoxypropionamide, 2,3-epoxypropionic acid, 2-methyl-2,3-epoxypropionic acid, 1,2-epoxy-3-isopropoxypropane, and 1,2-epoxy-3-phenoxypropane.

5. A process according to claim 1 for the preparation of a 1(A-hydroxyalkylated) 2-aryl-5-nitroimidazole wherein A is 2 or 3 having the structure:

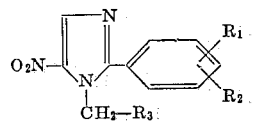

wherein
$R_3$ is hydroxyloweralkyl, hydroxyloweralkoxyalkyl or substituted hydroxyloweralkyl wherein the hydroxyloweralkyl is substituted by hydroxy, halo, carboxy, lower alkoxy, aldehydo, cyano, carboxamidoloweralkylcarboxy or phenoxy; $R_1$ and $R_2$ are selected from the group consisting of: hydrogen, halo, nitro, thienyl, furyl, cyanato, cyano, thiocyano, carboxy, loweralkenoyl, loweralkanoyl, mononucleararyllow-
eralkenoyl, mononucleararylloweralkanoyl, carbalkoxy, haloloweralkenyl, phenyldiazo, loweralkylsulfinyl, loweralkylsulfonyl, formyl,
loweralkyl and substituted loweralkyl wherein the substituents are: loweralkanoylamino, hydroxy, phenoxycarbonyloxy, diloweralkoxy, loweralkoxy, diloweralkylcarbamoyloxy, diloweralkylthioncarbomoyloxy, halo;
loweralkoxy and substituted loweralkoxy wherein the substituents are halo, carbamoyl and thiocarbamoyl,
substituted amino, where the substituents are haloloweralkanoyl, diloweralkylcarbamoylloweralkyl, loweralkanoyl, mononucleararylloweralkanoyl,
substituted thio, wherein the substituents are loweralkyl, diloweralkylthioncarbamoyl, loweralkylthioncarbamoyl, thioncarbamoyl, loweralkoxythiocarbonyl,
sulfonamido and substituted sulfonamido, wherein the substituents are loweralkyl, mononucleararyl, mononucleararylloweralkyl,
carboxamido and substituted carboxamido, wherein the substituents are loweralkyl, mononucleararyl and mononucleararylloweralkyl;
carbamoyloxy and substituted carbamoyloxy wherein the substituents are diloweralkyl; and
diloweralkylthiocarbamoyloxy; wherein the terms loweralkyl, loweralkenyl, loweralkoxy, loweralkanoyl, and loweralkenoyl hereinabove represent groups having from 1 to 5 carbon atoms, which comprises reacting a compound having the structure:

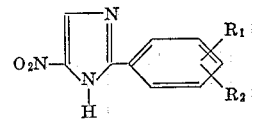

wherein
$R_1$ and $R_2$ are as above with a Lewis acid from the group consisting of boron trifluoride, sulfur trioxide, stannic chloride, titanium tetrachloride, aluminum trichloride, and antimony pentachloride followed by a compound selected from the group consisting of 1,2-epoxyethane, 1,2-epoxypropane, 1,2-epoxybutane, 1,3-epoxypropane, 1,3-epoxybutane, 1,2-epoxypentane, epichlorohydrin, epibromohydrin, 2,3-epoxypropanol, 2,3-epoxypropionaldehyde, ethyl-2,3-epoxypropionate 2,3-epoxypropionitrile, 2,3-epoxypropionamide, 2,3-epoxypropionic acid, 2-methyl-2,3-epoxpropionic acid, 1,2-epoxy-3-isopropoxypropane and 1,2-epoxy-3-phenoxypropane.

6. A process according to claim 5 wherein the reaction is carried out in an aprotic solvent.

7. A process according to claim 6 wherein the solvent is diethylether, tetrahydrofuran, dioxan, diethylenegylcol dimethylether, ethyleneglycol dimethylether, ethylacetate, nitromethane, benzene, ethylenedichloride or tetramethylenesulfone.

8. A process according to claim 5 wherein the Lewis acid is boron trifluoride, sulfur trioxide, stannic chloride, or titanium tetrachloride and the reaction is carried out in a lower aliphatic acid.

9. A process according to claim 5 for the preparation of a compound having the formula:

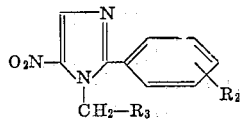

wherein
$R_2$ is p-fluoro, m-fluoro, p-cyano, m-cyano, p-carboxamido, m-carboxamido, p-nitro, m-nitro, o-nitro, p-chloro, m-chloor, hydrogen, p-trifluoromethyl, $R_3$ is hydroxyloweralkyl, hydroxyethoxymethylene or halo substituted hydroxyloweralkyl, which comprises reacting a compound having the formula:

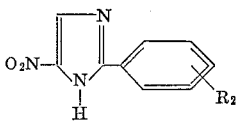

with a Lewis acid selected from the group consisting of boron trifluoride, sulfur trioxide, stannic chloride, titanium tetrachloride, aluminum trichloride and antimony pentachloride followed by an epoxide selected from the group consisting of 1,2-epoxyethane, 1,2-epoxypropane, 1,2-epoxybutane, 1,3-epoxypropane and epichlorohydrin.

10. A process for the preparation of an equimolar complex of a Lewis acid and a compound of the formula:

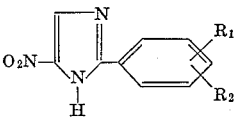

wherein $R_1$ and $R_2$ are selected from the group consisting of: hydrogen, halo, nitro, thienyl, furyl, cyanato, cyano, thiocyano, carboxy, loweralkenoyl, loweralkanoyl, mononucleararylloweralkenoyl mononucleararylloweralkanoyl, carbalkoxy, haloloweralkenyl, phenyldiazo, loweralkylsulfinyl, loweralkylsulfonyl, formyl, loweralkyl and substituted loweralkyl wherein the substituents are: loweralkenoylamino, hydroxy, phenoxycarbonyloxy, diloweralkoxy, loweralkoxy, diloweralkylcarbamoyloxy, diloweralkylthioncarbamoyloxy, halo, loweralkoxy and substituted loweralkoxy wherein the substituents are halo, carbamoyl and thiocarbamoyl, substituted amino, wherein the substituents are haloloweralkanoyl, diloweralkylcarbamoylloweralkyl loweralkanoyl, mononucleararylloweralkanoyl, substituted thio, wherein the substituents are loweralkyl, diloweralkylthioncarbamoyl, loweralkylthioncarbamoyl, thioncarbamoyl, loweralkoxythiocarbonyl, sulfonamido and substituted sulfonamido, wherein the substituents are loweralkyl, mononucleararyl, mononucleararylloweralkyl, carboxamido and substituted carboxamido, wherein the substituents are loweralkyl, mononucleararyl and mononucleararylloweralkyl;

carbamoyloxy and substituted carbamoyloxy wherein the substituents are diloweralkyl;

and diloweralkylthiocarbamoyloxy wherein the terms loweralkyl, loweralkenyl, loweralkoxy, loweralkanoyl, and loweralkenoyl hereinabove represent group having from 1 to 5 carbon atoms, which comprises intimately contacting together a Lewis acid from the group consisting of boron trifluoride, sulfur trioxide, stannic chloride, titanium tetrachloride, aluminum trichloride, and antimony pentachoride and a compound of the foregoing structural formula.

11. A process according to claim 10 wherein the reaction is carried out in an aprotic solvent.

12. A process according to claim 10 wherein the solvent is diethylether, tetrahydrofuran, dioxan, ethyleneglycoldimethylether, ethyl acetate, nitromethane, benzene, ethylene dichloride or tetramethylene sulfone.

13. A process according to claim 10 wherein the Lewis acid is boron trifluoride, sulfur trioxide, tin tetrachloride, or titanium tetrachloride and the reaction is carried out in a lower aliphatic acid.

14. A compound having the formula:

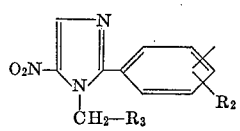

wherein $R_2$ is p-fluoro or p-nitro, $R_3$ is hydroxybromoethyl, hydroxychloroethyl or hydroxyethoxymethylene.

15. A compound according to claim 14 wherein $R_2$ is p-nitro and $R_3$ is hydroxychloroethyl.

16. A compound according to claim 14 wherein $R_2$ is p-nitro and $R_3$ is hydroxyethoxymethylene.

17. A compound according to claim 14 wherein $R_2$ is p-nitro and $R_3$ is hydroxybromoethyl.

18. A compound according to claim 14 wherein $R_2$ is p-fluoro and $R_3$ is hydroxybromoethyl.

19. A compound according to claim 14 wherein $R_2$ is p-fluoro and $R_3$ is hydroxychloroethyl.

20. A compound according to claim 14 wherein $R_2$ is p-fluoro and $R_3$ is hydroxyethoxymethylene.

21. An equimolar complex of a Lewis acid from the group consisting of boron trifluoride, sulfur trioxide, stannic chloride, titanium tetrachloride, aluminum trichloride, and antimony pentachloride and a compound of the formula:

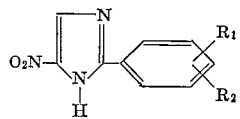

wherein $R_1$ and $R_2$ are selected from the group consisting of: hydrogen, halo, nitro, thienyl, furyl, cyanato, cyano, thiocyano, carboxy, loweralkenoyl, loweralkanoyl, mononucleararylloweralkenoyl, mononucleararylloweralkanoyl, carbalkoxy, haloloweralkenyl, phenyldiazo, loweralkylsulfinyl, loweralkylsulfonyl, formyl, loweralkyl and substituted loweralkyl wherein the substituents are: loweralkanoylamino, hydroxy, phenoxycarbonyloxy, diloweralkoxy, loweralkoxy, diloweralkylcarbamyloxy, diloweralkylthioncarbamoyloxy, halo, loweralkoxy and substituted loweralkoxy wherein the substituents are halo, carbamoyl and thiocarbamoyl, substituted amino, wherein the substituents are haloloweralkanoyl, diloweralkylcarbamoylloweralkyl loweralkanoyl, mononucleararylloweralkanoyl, substituted thio, wherein the substituents are loweralkyl, diloweralkylthioncarbamoyl, loweralkylthioncarbamoyl, thioncarbamoyl, loweralkoxythiocarbonyl, sulfonamido and substituted sulfonamido, wherein the substituents are loweralkyl, mononucleararyl, mononucleararylloweralkyl;

carboxamido and substituted carboxamido, wherein the substituents are loweralkyl, mononucleararyl and mononucleararylloweralkyl; carbamoyloxy and substituted carbamoyloxy wherein the substituents are diloweralkyl;

and diloweralkylthiocarbamoyloxy, wherein the terms loweralkyl, loweralkenyl, loweralkoxy, and loweralkanoyl, and loweralkenoyl hereinabove represent groups having from 1 to 5 carbon atoms, which comprises intimately contacting together said Lewis acid and a compound of the foregoing structural formula.

22. An equimolar complex, according to claim 21, of a compound having the formula:

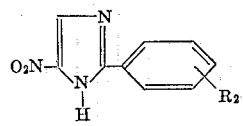

wherein

R₂ is p-fluoro, m-fluoro, p-cyano, m-cyano, p-carboxamido, m-carboxamido, p-nitro, m-nitro, o-nitro, p-chloro, m-chloro, hydrogen, p-trifluoromethyl, R₃ is hydrogen, methyl, ethyl, hydroxyethoxy, hydroxy-methyl, or chloromethylene with a Lewis acid selected from the group consisting of boron trifluoride, sulfur trioxide, stannic chloride, titanium tetrachloride, aluminum trichloride and antimony pentachloride.

References Cited

Ellis et al., J. Pharm. Pharmacol., vol. 16 (1964) pp. 801–9.

ALEX MAZEL, *Primary Examiner.*

R. GALLAGHER, *Assistant Examiner.*